(12) United States Patent
Zhang et al.

(10) Patent No.: US 11,916,849 B2
(45) Date of Patent: Feb. 27, 2024

(54) TECHNIQUES FOR MANAGING TRANSMISSION DIRECTION CONFLICTS

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 17/518,412

(22) Filed: Nov. 3, 2021

(65) Prior Publication Data

US 2023/0134918 A1    May 4, 2023

(51) Int. Cl.
*H04L 5/14*      (2006.01)
*H04W 76/27*   (2018.01)
*H04W 72/23*   (2023.01)

(52) U.S. Cl.
CPC ............... *H04L 5/14* (2013.01); *H04W 72/23* (2023.01); *H04W 76/27* (2018.02)

(58) Field of Classification Search
None
See application file for complete search history.

(56) References Cited

U.S. PATENT DOCUMENTS

| | | | | |
|---|---|---|---|---|
| 2008/0153431 | A1* | 6/2008 | Haartsen | H04B 1/48 455/78 |
| 2016/0330011 | A1* | 11/2016 | Lee | H04W 52/10 |
| 2017/0170946 | A1* | 6/2017 | Min | H04L 5/1438 |
| 2018/0091185 | A1* | 3/2018 | Na | H04B 17/373 |
| 2018/0167832 | A1* | 6/2018 | Fang | H04W 24/08 |
| 2020/0169377 | A1* | 5/2020 | Lee | H04W 56/0015 |
| 2020/0305157 | A1* | 9/2020 | Kim | H04W 74/0833 |
| 2021/0203469 | A1 | 7/2021 | Abedini et al. | |
| 2021/0274544 | A1 | 9/2021 | Yang et al. | |

OTHER PUBLICATIONS

International Search Report and Written Opinion—PCT/US2022/078712—ISA/EPO—dated Feb. 16, 2023.

* cited by examiner

*Primary Examiner* — Clemence S Han
(74) *Attorney, Agent, or Firm* — Holland & Hart LLP

(57) ABSTRACT

Methods, systems, and devices for wireless communications are described. A user equipment (UE) may identify a full-duplexing rule that indicates to refrain from using a transmission dropping rule for transmission direction conflicts that occur between uplink and downlink transmissions in a same symbol. The UE may receive a control message scheduling transmission of a message during a symbol, where a transmission direction conflict arises between a first transmission direction of the message and a second transmission direction of the symbol. For example, the UE may identify a transmission direction conflict between an uplink transmission direction of the message and a downlink transmission direction of the symbol. The UE may communicate the message during the symbol based on the full-duplexing rule. The described techniques may enable the UE to attain reduced latency and higher throughput based on reducing a number of transmissions dropped by the UE.

30 Claims, 16 Drawing Sheets

TECHNIQUES FOR MANAGING TRANSMISSION DIRECTION CONFLICTS

FIELD OF TECHNOLOGY

The following relates to wireless communications, including techniques for managing transmission direction conflicts.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communication systems, a transmission direction conflict may occur between a first transmission direction of a message and a second transmission direction of a symbol in which the message is scheduled. In such cases, a wireless device may drop (e.g., refrain from transmitting) the message, which may result in higher latency and decreased throughput.

SUMMARY

The described techniques relate to improved methods, systems, devices, and apparatuses that support techniques for managing transmission direction conflicts. Generally, the described techniques provide for enabling a user equipment (UE) to mitigate transmission direction conflicts. A UE may identify a full-duplexing rule that indicates to refrain from using a transmission dropping rule for transmission direction conflicts that occur between uplink and downlink transmissions in a same symbol. The UE may receive a control message scheduling transmission of a message during a symbol, where a transmission direction conflict arises between a first transmission direction of the message and a second transmission direction of the symbol. The UE may communicate the message during the symbol based on the full-duplexing rule. The described techniques may enable the UE to attain reduced latency and higher throughput based on reducing a number of transmissions dropped by the UE.

A method for wireless communications at a UE is described. The method may include identifying a full-duplexing rule that indicates to refrain from using a transmission dropping rule for transmission direction conflicts that occur between uplink and downlink transmissions in a same symbol, receiving, from a base station, a control message scheduling transmission of a message during a symbol, where a transmission direction conflict exists between a first transmission direction of the message and a second transmission direction of the symbol, and communicating the message during the symbol based on the full-duplexing rule.

An apparatus for wireless communications at a UE is described. The apparatus may include a processor, memory coupled with the processor, and instructions stored in the memory. The instructions may be executable by the processor to cause the apparatus to identify a full-duplexing rule that indicates to refrain from using a transmission dropping rule for transmission direction conflicts that occur between uplink and downlink transmissions in a same symbol, receive, from a base station, a control message scheduling transmission of a message during a symbol, where a transmission direction conflict exists between a first transmission direction of the message and a second transmission direction of the symbol, and communicate the message during the symbol based on the full-duplexing rule.

Another apparatus for wireless communications at a UE is described. The apparatus may include means for identifying a full-duplexing rule that indicates to refrain from using a transmission dropping rule for transmission direction conflicts that occur between uplink and downlink transmissions in a same symbol, means for receiving, from a base station, a control message scheduling transmission of a message during a symbol, where a transmission direction conflict exists between a first transmission direction of the message and a second transmission direction of the symbol, and means for communicating the message during the symbol based on the full-duplexing rule.

A non-transitory computer-readable medium storing code for wireless communications at a UE is described. The code may include instructions executable by a processor to identify a full-duplexing rule that indicates to refrain from using a transmission dropping rule for transmission direction conflicts that occur between uplink and downlink transmissions in a same symbol, receive, from a base station, a control message scheduling transmission of a message during a symbol, where a transmission direction conflict exists between a first transmission direction of the message and a second transmission direction of the symbol, and communicate the message during the symbol based on the full-duplexing rule.

Some examples of the method, apparatuses, and non-transitory computer-readable medium described herein may further include operations, features, means, or instructions for receiving, from the base station, control signaling identifying the full-duplexing rule that indicates for the UE to refrain from using the transmission dropping rule for transmission direction conflicts that occur for a downlink symbol, for an uplink symbol, for a flexible symbol, for a dedicated symbol, or any combination thereof, where communicating the message during the symbol may be based on the UE refraining from using the transmission dropping rule.

In some examples of the method, apparatuses, and non-transitory computer-readable medium described herein, the control signaling, the control message, or both include one or more of a radio resource control (RRC) message, a medium access control (MAC)-control element (CE), or an instance of downlink control information (DCI).

In some examples of the method, apparatuses, and non-transitory computer-readable medium described herein, communicating the message during the symbol may include operations, features, means, or instructions for communicating the message during the symbol based on the control message identifying the full-duplexing rule that indicates for the UE to refrain from using the transmission dropping rule.

Some examples of the method, apparatuses, and non-transitory computer-readable medium described herein may further include operations, features, means, or instructions for receiving, from the base station, control signaling indicating a set of transmission dropping rules including the transmission dropping rule and a set of full-duplexing rules including the full-duplexing rule, where communicating the message during the symbol may be based on the control signaling.

In some examples of the method, apparatuses, and non-transitory computer-readable medium described herein, identifying the full-duplexing rule may include operations, features, means, or instructions for identifying the full-duplexing rule that corresponds to a downlink symbol, an uplink symbol, a flexible symbol, a dedicated symbol, a dedicated RRC downlink symbol, or any combination thereof.

Some examples of the method, apparatuses, and non-transitory computer-readable medium described herein may further include operations, features, means, or instructions for receiving, from the base station, control signaling indicating a capability of the base station to support full-duplex communications, where communicating the message during the symbol may be based on the capability of the base station to support full-duplex communications.

Some examples of the method, apparatuses, and non-transitory computer-readable medium described herein may further include operations, features, means, or instructions for identifying the transmission direction conflict between an uplink transmission direction of the message and a RRC downlink transmission direction of the symbol, where the message includes a semi-persistent acknowledgement (ACK) or negative acknowledgement (NACK) message, a scheduling request, a configured grant uplink transmission, a dynamic grant uplink transmission, or any combination thereof.

Some examples of the method, apparatuses, and non-transitory computer-readable medium described herein may further include operations, features, means, or instructions for identifying the transmission direction conflict between a downlink transmission direction of the message and a RRC uplink transmission direction of the symbol, where the message includes a downlink transmission on a control resource set (CORESET), a semi-persistent downlink transmission, a dynamic grant downlink transmission, or any combination thereof.

Some examples of the method, apparatuses, and non-transitory computer-readable medium described herein may further include operations, features, means, or instructions for identifying the transmission direction conflict between an uplink or downlink transmission direction of the message and a downlink or uplink transmission direction of the symbol that may be a RRC flexible symbol, where the message includes a semi-persistent ACK or NACK message, a scheduling request, a configured grant transmission, a semi-persistent transmission, a reference signal transmission, or any combination thereof.

Some examples of the method, apparatuses, and non-transitory computer-readable medium described herein may further include operations, features, means, or instructions for identifying the transmission direction conflict between the first transmission direction of the message and the second transmission direction of the symbol based on a slot format indicator (SFI) configuration of the symbol, where the message includes a transmission on a CORESET and the symbol includes an SFI uplink symbol or an SFI flexible symbol.

Some examples of the method, apparatuses, and non-transitory computer-readable medium described herein may further include operations, features, means, or instructions for identifying the transmission direction conflict between the first transmission direction of the message and the second transmission direction of the symbol based on a first reference component carrier (CC) of the symbol and a second CC to be used for transmission of the message, the symbol including a RRC downlink symbol, the message including a configured grant uplink transmission, a dynamic grant uplink transmission, or both.

Some examples of the method, apparatuses, and non-transitory computer-readable medium described herein may further include operations, features, means, or instructions for identifying the transmission direction conflict between the first transmission direction of the message and the second transmission direction of the symbol based on a reference CC of the symbol and a CC to be used for transmission of the message, the symbol including an uplink symbol, the message including a configured grant downlink transmission, a dynamic grant downlink transmission, or any combination thereof.

Some examples of the method, apparatuses, and non-transitory computer-readable medium described herein may further include operations, features, means, or instructions for receiving, from the base station, DCI that includes a dynamic indication of the full-duplexing rule.

In some examples of the method, apparatuses, and non-transitory computer-readable medium described herein, the UE may be preconfigured with the full-duplexing rule and the full-duplexing rule may be configured by the base station.

In some examples of the method, apparatuses, and non-transitory computer-readable medium described herein, the full-duplexing rule may be applicable to dedicated RRC downlink symbols.

In some examples of the method, apparatuses, and non-transitory computer-readable medium described herein, the symbol includes a RRC downlink symbol, a dedicated RRC downlink symbol, a common RRC downlink symbol, a RRC downlink symbol configured by the base station, or a combination thereof.

A method for wireless communications at a base station is described. The method may include identifying a full-duplexing rule that indicates to refrain from using a transmission dropping rule for transmission direction conflicts that occur between uplink and downlink transmissions in a same symbol, transmitting, to a UE, a control message scheduling transmission of a message during a symbol, where a transmission direction conflict exists between a first transmission direction of the message and a second transmission direction of the symbol, and communicating the message during the symbol based on the full-duplexing rule and the control message.

An apparatus for wireless communications at a base station is described. The apparatus may include a processor, memory coupled with the processor, and instructions stored in the memory. The instructions may be executable by the processor to cause the apparatus to identify a full-duplexing rule that indicates to refrain from using a transmission dropping rule for transmission direction conflicts that occur between uplink and downlink transmissions in a same symbol, transmit, to a UE, a control message scheduling transmission of a message during a symbol, where a transmission direction conflict exists between a first transmission direction of the message and a second transmission direction of the symbol, and communicate the message during the symbol based on the full-duplexing rule and the control message.

Another apparatus for wireless communications at a base station is described. The apparatus may include means for identifying a full-duplexing rule that indicates to refrain from using a transmission dropping rule for transmission direction conflicts that occur between uplink and downlink transmissions in a same symbol, means for transmitting, to a UE, a control message scheduling transmission of a message during a symbol, where a transmission direction conflict exists between a first transmission direction of the message and a second transmission direction of the symbol, and means for communicating the message during the symbol based on the full-duplexing rule and the control message.

A non-transitory computer-readable medium storing code for wireless communications at a base station is described. The code may include instructions executable by a processor to identify a full-duplexing rule that indicates to refrain from using a transmission dropping rule for transmission direction conflicts that occur between uplink and downlink transmissions in a same symbol, transmit, to a UE, a control message scheduling transmission of a message during a symbol, where a transmission direction conflict exists between a first transmission direction of the message and a second transmission direction of the symbol, and communicate the message during the symbol based on the full-duplexing rule and the control message.

Some examples of the method, apparatuses, and non-transitory computer-readable medium described herein may further include operations, features, means, or instructions for transmitting control signaling identifying the full-duplexing rule that indicates for the UE to refrain from using the transmission dropping rule when the transmission direction conflict occurs for a downlink symbol, for an uplink symbol, for a flexible symbol, for a dedicated symbol, or any combination thereof, where communicating the message during the symbol may be based on the UE refraining from using the transmission dropping rule.

In some examples of the method, apparatuses, and non-transitory computer-readable medium described herein, communicating the message during the symbol may include operations, features, means, or instructions for communicating the message during the symbol based on the control message identifying the full-duplexing rule that indicates for the UE to refrain from using the transmission dropping rule.

Some examples of the method, apparatuses, and non-transitory computer-readable medium described herein may further include operations, features, means, or instructions for transmitting control signaling indicating a set of transmission dropping rules including the transmission dropping rule and a set of full-duplexing rules including the full-duplexing rule, where communicating the message during the symbol may be based on the control signaling.

In some examples of the method, apparatuses, and non-transitory computer-readable medium described herein, the set of transmission dropping rules, the set of full-duplexing rules, or both correspond to one or more dedicated RRC downlink symbols.

In some examples of the method, apparatuses, and non-transitory computer-readable medium described herein, transmitting the control message may include operations, features, means, or instructions for transmitting, to the UE, control signaling indicating a capability of the base station to support full-duplex communications, where communicating the message during the symbol may be based on the capability of the base station to support full-duplex communications.

In some examples of the method, apparatuses, and non-transitory computer-readable medium described herein, communicating the message during the symbol may include operations, features, means, or instructions for receiving the message from the UE during the symbol based on the control message, where the symbol includes a RRC downlink symbol and the message includes a semi-persistent ACK or NACK message, a scheduling request, a configured grant transmission, a semi-persistent transmission, a reference signal transmission, or any combination thereof and transmitting a second message to a second UE during the symbol in accordance with a full-duplex communication scheme.

In some examples of the method, apparatuses, and non-transitory computer-readable medium described herein, communicating the message during the symbol may include operations, features, means, or instructions for transmitting the message to the UE during the symbol based on the control message, where the symbol includes a RRC uplink symbol and the message includes a downlink transmission on a CORESET, a semi-persistent downlink transmission, a dynamic grant downlink transmission, or any combination thereof and receiving a second message from a second UE during the symbol in accordance with a full-duplex communication scheme.

In some examples of the method, apparatuses, and non-transitory computer-readable medium described herein, communicating the message during the symbol may include operations, features, means, or instructions for communicating the message during the symbol based on the control message, where the symbol includes a RRC flexible symbol and the message includes a semi-persistent ACK or NACK message, a scheduling request, a configured grant transmission, a semi-persistent transmission, a reference signal transmission, or any combination thereof.

In some examples of the method, apparatuses, and non-transitory computer-readable medium described herein, the full-duplexing rule may be based on a scheduling alignment of common RRC downlink symbols for multiple base stations including the base station.

DETAILED DESCRIPTION

Figure 1:
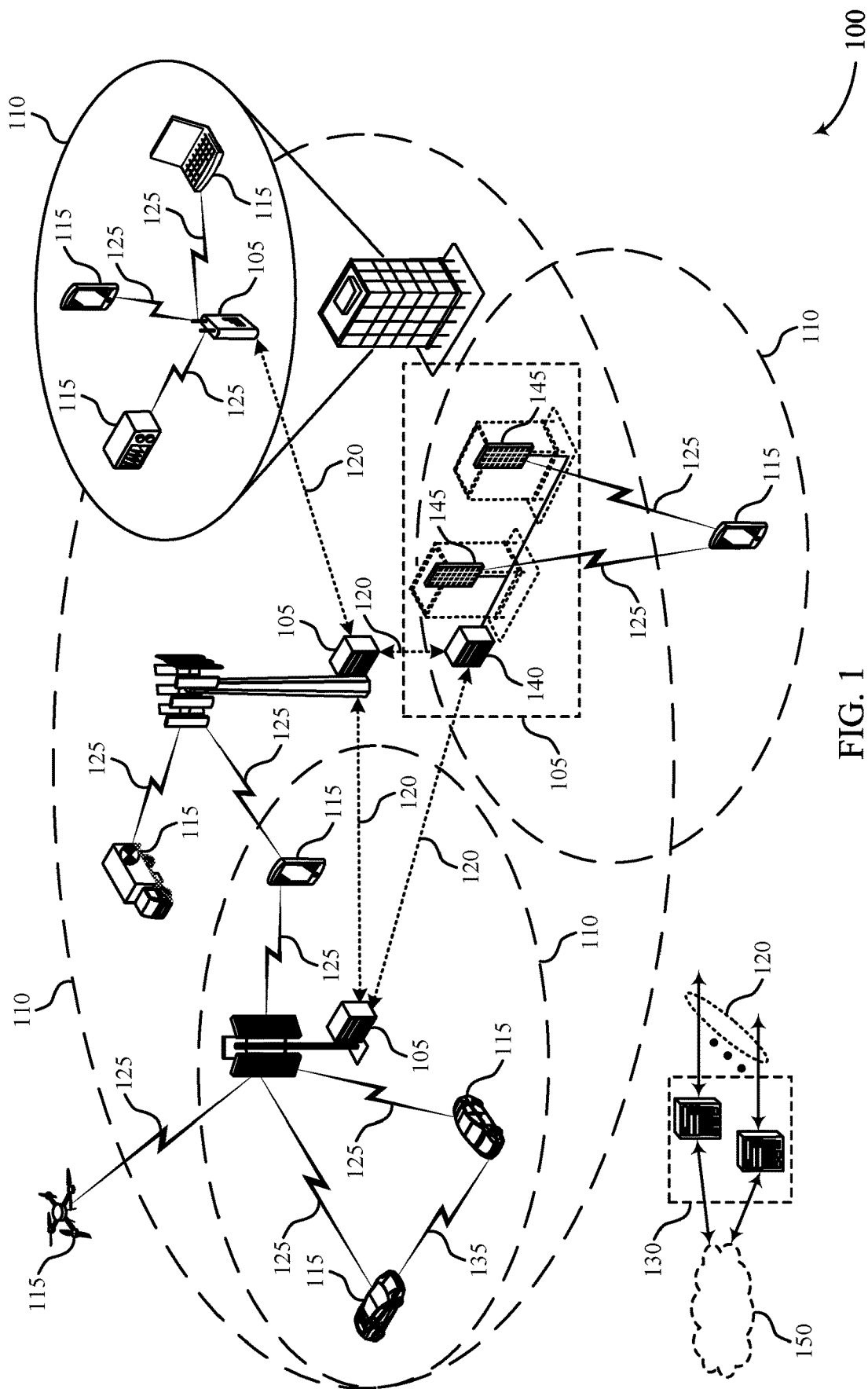
FIGS. 1 and 2 illustrate examples of wireless communications systems that support techniques for managing transmission direction conflicts in accordance with aspects of the present disclosure.

In some wireless communications systems, a user equipment (UE) may receive an indication of a time division duplexing (TDD) configuration or a slot format indicator (SFI) configuration that designates symbols as uplink symbols, downlink symbols, or flexible symbols. The UE may also be configured with a set of rules for dropping transmissions scheduled in conflicting symbols. For example, if the UE is scheduled to transmit an uplink message to a base station in a downlink symbol, the UE may drop the uplink message in accordance with the set of rules.

Dropping the uplink message may reduce the likelihood of the uplink message interfering with other downlink messages (e.g., transmissions from the base station) in the downlink symbol. In some cases, however, the base station may be capable of performing full-duplex communications. As such, the base station may be capable of receiving the uplink message from the UE while simultaneously transmitting other downlink messages. Thus, dropping the uplink message in accordance with the set of rules may unnecessarily decrease the throughput and efficiency of communications between the UE and the base station.

Aspects of the present disclosure provide for configuring the UE with a set of full-duplexing rules (e.g., relaxed dropping rules). The UE may determine whether to drop a transmission scheduled in a conflicting symbol based on the set of full-duplexing rules. For example, if the UE is scheduled to transmit a semi-persistent scheduled (SPS) acknowledgement (ACK) or negative acknowledgement (NACK) message to the base station in a downlink symbol, the UE may transmit the SPS ACK or NACK in accordance with the set of full-duplexing rules rather than cancelling the SPS ACK or NACK. Similarly, if the UE is scheduled to monitor a control resource set (CORESET) during an uplink symbol, the UE may follow through with the CORESET monitoring in accordance with the set of full-duplexing rules instead of skipping the CORESET monitoring.

In some examples, the base station may indicate the set of full-duplexing rules to the UE via downlink control information (DCI). For example, the base station may transmit control signaling that explicitly instructs the UE to transmit a message in a conflicting symbol. That is, the base station may configure the UE to override transmission dropping rules for a transmission direction conflict. In other examples, the UE may be preconfigured with the set of full-duplexing rules. Using the set of full-duplexing rules to handle transmission direction conflicts may result in higher throughput and reduced latency at the UE, among other benefits.

Aspects of the present disclosure are initially described in the context of wireless communications systems, communication timelines, and process flows. Aspects of the disclosure are further illustrated by and described with reference to apparatus diagrams, system diagrams, and flowcharts that relate to techniques for managing transmission direction conflicts.

FIG. 1 illustrates an example of a wireless communications system 100 that supports techniques for managing transmission direction conflicts in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with one or more downlink component carrier (CC) and one or more uplink CC according to a carrier aggregation configuration. Carrier aggregation may be used with both frequency division duplexing (FDD) and time division duplexing (TDD) CCs.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may support full-duplex communications between wireless devices. For example, a wireless communications system may support simultaneous uplink and downlink transmission in a specific frequency range (e.g., frequency range 2 (FR2) or other frequency bands). The wireless communications system may support full-duplex communications for IAB nodes or for access links between UEs 115 and base stations 105. Both UEs 115 and base stations 105 may be capable of performing full-duplex communications. For example, a UE 115 may perform uplink transmission using a first antenna panel and downlink reception using a second antenna panel. As another example, a base station 105 may perform uplink reception using one antenna panel and downlink transmission using another antenna panel.

Full-duplex capabilities may depend on beam separation. In some examples, full-duplex communications may result in self-interference (e.g., between uplink and downlink operations), clutter echo, or both. However, full-duplex communications may also provide latency reduction. For example, a UE 115 may be able to receive a downlink signal in uplink slots, which may enable the UE 115 to experience latency savings. Full-duplex communications may also provide spectrum efficiency enhancements (e.g., per cell or per UE) and more efficient resource utilization. If, for example, a base station 105 is capable of performing full-duplex transmission and reception with different UEs 115 (e.g., half-duplex UEs 115), the base station 105 and UEs 115 may refrain from dropping (e.g., cancelling) transmissions scheduled in conflicting symbols. Performing scheduled transmissions (e.g., full-duplex communications) in conflicting symbols may provide latency reduction and spectrum efficiency enhancements (e.g., in comparison to dropping the scheduled transmissions).

The wireless communications system 100 may support techniques for reduced latency, higher throughput, and more efficient utilization of communication resources, among other benefits. Specifically, the described techniques may provide for configuring a UE 115 with a set of full-duplexing rules (e.g., relaxed dropping rules), which may reduce a number of transmissions dropped by the UE 115. For example, if the UE 115 detects a conflict between a transmission direction of a message and a transmission direction of a symbol in which the message is scheduled, the UE 115 may transmit the message in accordance with the set of relaxed dropping rules (e.g., instead of dropping the message due to the transmission direction conflict), which may result in higher throughput and reduced latency, among other benefits.

Figure 2:
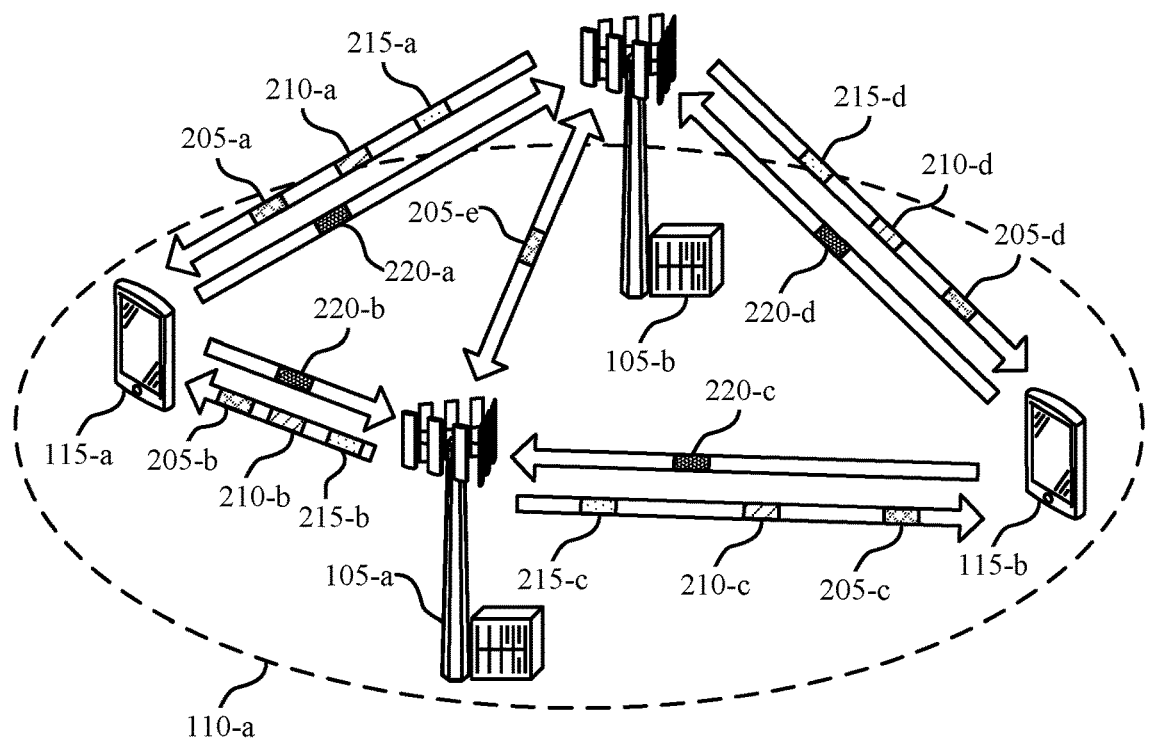

FIG. 2 illustrates an example of a wireless communications system 200 that supports techniques for managing transmission direction conflicts in accordance with aspects of the present disclosure. The wireless communications system 200 may implement or be implemented by aspects of the wireless communications system 100. For example, the wireless communications system 200 may include a UE 115-a, a UE 115-b, a base station 105-a, and a base station 105-b, which may be examples of corresponding devices described with reference to FIG. 1. The base stations 105 and the UEs 115 may communicate within a geographic coverage area 110-a, which may be an example of a geographic coverage area 110 described with reference to FIG. 1. In the wireless communications system 200, one or both of the base stations 105 may support full-duplex communications.

The wireless communications system 200 may support different full-duplex use cases and types. Some example use cases of full-duplex may include full-duplex communications between one UE and two TRPs, full-duplex communications between one base station and two UEs, or full-duplex communications between one UE and one base station. For example, the UE 115-a may receive a downlink message 215-a from the base station 105-b while simultaneously transmitting an uplink message 220-b to the base station 105-a. Likewise, the base station 105-b may receive an uplink message 220-a from the UE 115-a while simultaneously transmitting a downlink message 215-d to the UE 115-b. Additionally or alternatively, the base station 105-a may transmit a downlink message 215-c to the UE 115-b while simultaneously receiving an uplink message 220-c from the UE 115-b.

If, for example, the base stations 105 are capable of operating in full-duplex mode, the UEs 115 may be able to override some dropping rules for conflicting symbols. In some cases, the base stations 105 can instruct the UEs 115 to refrain from dropping transmissions. This instruction may be explicit (e.g., signaled by the base stations 105) or implicit (e.g., preconfigured). For example, the base station 105-a may transmit DCI to the UE 115-a that includes a dynamic indication to refrain from dropping specific transmissions when a transmission direction conflict occurs during one or more symbol periods.

In the example of FIG. 2, the base stations 105 may transmit control signaling 205 to the UEs 115. For example, the base station 105-a may transmit control signaling 205-b to the UE 115-a, and may transmit control signaling 205-c to the UE 115-b. Similarly, the base station 105-b may transmit control signaling 205-a to the UE 115-a, and may transmit control signaling 205-d to the UE 115-b. The control signaling 205 may indicate a full-duplexing rule (equivalently referred to herein as a relaxed dropping rule) for mitigating transmission direction conflicts. The control signaling 205 may also indicate capabilities of the base stations 105 to support full-duplex communications. The control signaling 205 may include an RRC message, a MAC-CE, DCI, or a combination thereof. In some examples, the base stations 105 may exchange control signaling 205-e over a backhaul link, and may determine the full-duplexing rule (e.g., relaxed dropping rule) based on the control signaling 205-e. For example, the base stations 105 may determine the full-duplexing rule based on a scheduling alignment of common RRC downlink symbols between the base stations 105.

The base stations 105 may also transmit control messages 210 to the UEs 115. For example, the base station 105-a may transmit a control message 210-b to the UE 115-a, and may transmit a control message 210-c to the UE 115-b. Similarly, the base station 105-b may transmit a control message 210-a to the UE 115-a, and may transmit a control message 210-d to the UE 115-b. The control messages 210 may schedule communications between the base stations 105 and the UEs 115. For example, the control message 210-c may be an example of an RRC message that schedules SPS communications between the base station 105-a and the UE 115-b.

In some examples, there may be a transmission direction conflict between the communications scheduled by the control messages 210 and the symbols in which these communications are scheduled. In such examples, the UEs 115 may override the transmission direction conflict in accordance with an applicable full-duplexing rule. That is, the UEs 115 may perform the communications as scheduled instead of dropping the communications. For example, the UE 115-b may communicate (e.g., receive) a downlink message 215-d from the base station 105-b based on an applicable full-duplexing rule, even if the downlink message 215-d is scheduled in an uplink symbol. Similarly, the UE 115-b may transmit an uplink message 220-d to the base station 105-b based on an applicable full-duplexing rule, even if the uplink message 220-d is scheduled in a downlink symbol. Likewise, the UE 115-a may communicate (e.g., receive) a downlink message 215-b from the base station 105-a based on an applicable full-duplexing rule, even if the downlink message 215-b is scheduled in an uplink symbol.

The wireless communications system 200 may support techniques for reduced latency, higher throughput, and more efficient utilization of communication resources, among other benefits. Specifically, the described techniques may provide for configuring the UEs 115 with a full-duplexing rule (e.g., relaxed dropping rule), which may reduce a number of transmissions dropped by the UEs 115. For example, if the UEs 115 detect a conflict between a transmission direction of a message and a transmission direction of a symbol in which the message is scheduled, the UEs 115 may transmit the message in accordance with the full-duplexing rule (e.g., instead of dropping the message), which may result in higher throughput and reduced latency at the UEs 115, among other benefits.

Figure 3:
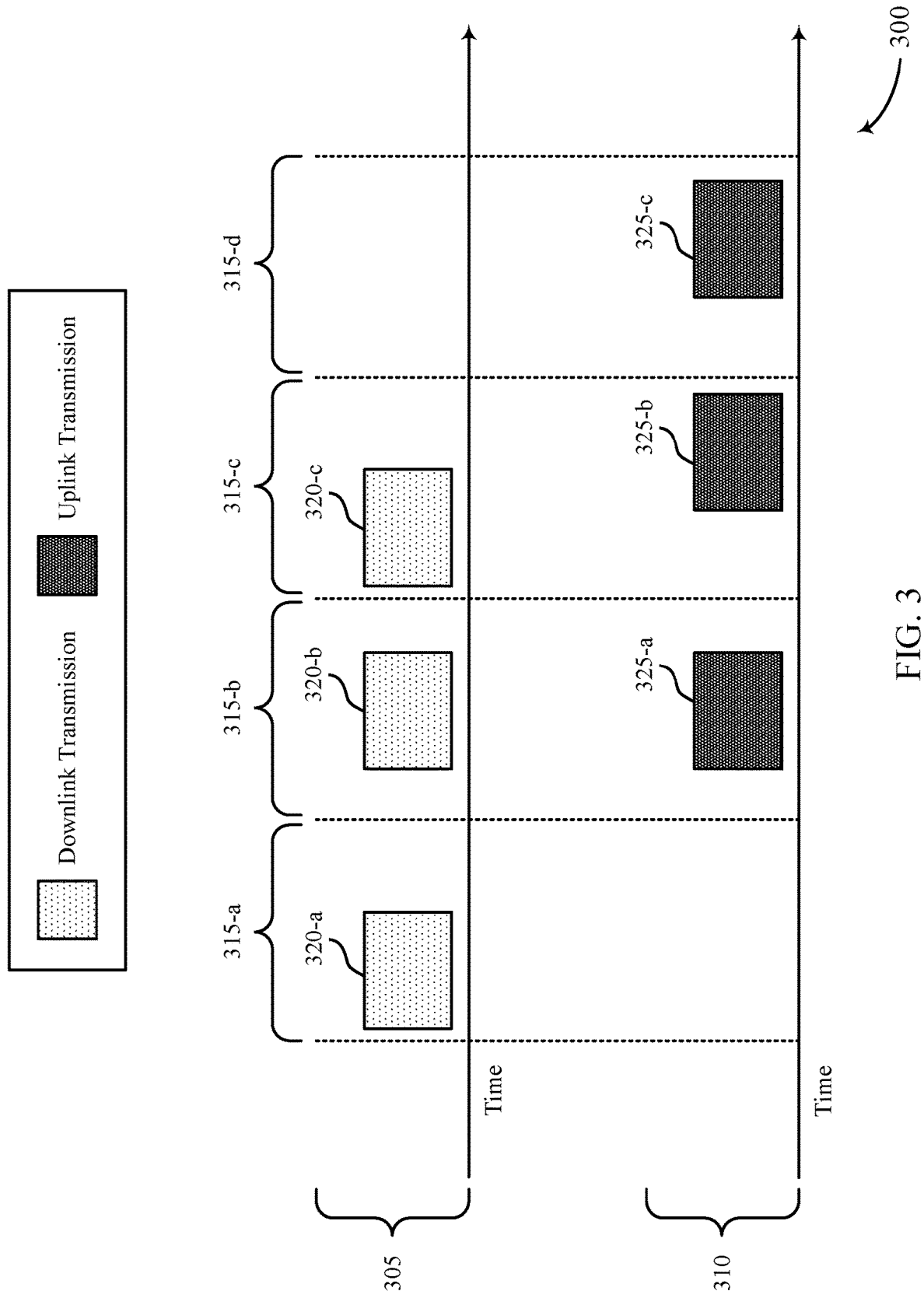
FIG. 3 illustrates an example of a communication timeline that supports techniques for managing transmission direction conflicts in accordance with aspects of the present disclosure.

FIG. 3 illustrates an example of a communication timeline 300 that supports techniques for managing transmission direction conflicts in accordance with aspects of the present disclosure. The communication timeline may implement or be implemented by aspects of the wireless communications system 100 or the wireless communications system. For example, the communication timeline may be implemented by a UE or a base station, which may be examples of corresponding devices described with reference to FIGS. 1 and 2. In the communication timeline 300, a UE may use a full-duplexing rule (e.g., a relaxed dropping rule) to mitigate a transmission direction conflict between a first transmission direction of a symbol and a second transmission direction of a transmission scheduled during the symbol.

The communication timeline 300 may support full-duplexing rules (e.g., relaxed dropping rules) for conflicting symbols in accordance with aspects of the present disclosure. In some examples, these full-duplexing rules may be preconfigured. In other examples, these full-duplexing rules may be signaled by a base station. In some examples, to have aligned scheduling across base stations in common RRC downlink symbols, the full-duplexing rules described herein may be applicable to only dedicated RRC downlink symbols. In other examples, the full-duplexing rules may correspond to a specific base station configuration (e.g., signaled to the UE).

Without the full-duplexing rules described herein, an RRC downlink symbol type may cancel SPS ACK or NACK transmissions, scheduling request transmissions, configured grant transmissions, and uplink dynamic grant transmissions. Likewise, an RRC uplink symbol type may cancel CORESET monitoring, SPS transmissions, and downlink dynamic grant transmissions. Similarly, an RRC flexible symbol may cancel SPS ACK or NACK transmissions (e.g., when no SFI is provided), scheduling requests, configured grant or SPS transmissions, and configured reference signal transmissions (e.g., beam failure detection (BFD) reference signal transmissions), among other examples. Additionally, an SFI flexible symbol or an SFI uplink symbol may cancel CORESET monitoring. An RRC downlink symbol on a reference CC may also cancel uplink configured transmissions and uplink dynamic grant transmissions on another CC. In a similar manner, an RRC uplink symbol on a reference CC may cancel downlink configured transmissions or downlink dynamic grant transmissions on another CC.

In accordance with the described techniques, a base station may indicate that a UE is to refrain from dropping a scheduled (e.g., activated, configured) transmission or reception when such conflicts occur. As an example, if a base station with full-duplex capabilities schedules a downlink transmission to a first UE in an RRC downlink symbol and an SPS ACK or NACK transmission from a second UE overlaps with the downlink transmission scheduled in the RRC downlink symbol, the base station may instruct the second UE to disregard the transmission direction conflict (e.g., between the RRC downlink symbol and the SPS ACK or NACK transmission) and proceed with transmitting the SPS ACK or NACK (e.g., because the base station can perform simultaneous transmission and reception in the RRC downlink symbol). This instruction from the base station may be dynamically indicated to the second UE via DCI. Alternatively, the second UE may be preconfigured with this instruction.

As another example, the base station may schedule a downlink transmission to the first UE in an RRC flexible symbol. If, for example, an SPS ACK or NACK transmission from the second UE overlaps with the downlink transmission scheduled in the RRC flexible symbol, the second UE may still transmit the SPS ACK or NACK transmission in the RRC flexible symbol because the base station can perform simultaneous transmission and reception with multiple UEs in the same RRC flexible symbol. As such, the second UE may not need to drop the SPS ACK or NACK transmission upon detecting a transmission direction conflict between the SPS ACK or NACK transmission and the RRC flexible symbol.

Additionally or alternatively, if the base station configures the second UE to monitor a CORESET in an SFI flexible symbol or an SFI uplink symbol, the second UE may perform the CORESET monitoring (e.g., even if there is a transmission direction conflict between the CORESET monitoring and the SFI flexible symbol or the SFI uplink symbol). Similarly, if the base station configures the second UE to perform an uplink configured transmission or an uplink dynamic grant transmission in an RRC downlink symbol and a reference CC of the RRC downlink symbol is different from a CC to be used for the uplink configured transmission or the uplink dynamic grant transmission, the second UE may perform the uplink configured transmission or the uplink dynamic grant transmission as scheduled (e.g., rather than dropping these transmissions). Likewise, if the base station configures the second UE to perform a downlink configured transmission or a downlink dynamic grant transmission in an RRC uplink symbol and a reference CC of the RRC uplink symbol is different from a CC to be used for the downlink configured transmission or the downlink dynamic grant transmission, the second UE may perform the downlink configured transmission or the downlink dynamic grant transmission as scheduled (e.g., in accordance with a full-duplexing rule).

FIG. 3 may illustrate a downlink timeline 305 and an uplink timeline 310. The downlink timeline 305 may include downlink transmissions 320 scheduled in symbols 315. For example, the downlink timeline 305 may include a downlink transmission 320-*a* scheduled in a symbol 315-*a*, a downlink transmission 320-*b* scheduled in a symbol 315-*b*, and a downlink transmission 320-*c* scheduled in a symbol 315-*c*. Similarly, the uplink timeline 310 may include uplink transmissions 325 scheduled in the symbols 315. For example, the uplink timeline 310 may include an uplink transmission 325-*a* scheduled in the symbol 315-*b*, an uplink transmission 325-*b* scheduled in the symbol 315-*c*, and an uplink transmission 325-*c* scheduled in the symbol 315-*d*.

In some examples, a base station may be scheduled to perform a downlink transmission and an uplink transmission in the same symbol. These scheduled transmissions may fully or partially overlap in time. For example, the downlink transmission 320-*b* may fully overlap with the uplink transmission 325-*a*, whereas the downlink transmission 320-*c* may partially overlap with the uplink transmission 325-*c*. In such examples, a transmission direction conflict may occur between the symbols 315 and the downlink transmissions 320 or the uplink transmissions 325. For example, if the symbol 315-*c* is a downlink symbol, a transmission direction conflict may occur between a transmission direction of the symbol 315-*c* and a transmission direction of the uplink transmission 325-*b*.

If, however, the base station is capable of performing full-duplex communications (e.g., simultaneous transmission and reception), the base station may be capable of transmitting the downlink transmission 320-c while simultaneously receiving the uplink transmission 325-b. In such examples, if the base station is scheduled to receive the uplink transmission 325-b from a UE, the base station may instruct the UE to refrain from dropping the uplink transmission 325-b. That is, the base station may configure the UE to override (e.g., disregard) the transmission direction conflict. Specifically, the base station may configure the UE with a full-duplexing rule (e.g., a relaxed dropping rule) that instructs the UE to override the transmission direction conflict. Thus, the UE may transmit the uplink transmission 325-b in the symbol 315-c based on the full-duplexing rule.

The communication timeline 300 may support techniques for reduced latency, higher throughput, and more efficient utilization of communication resources, among other benefits. Specifically, the described techniques may provide for configuring a UE with full-duplexing rules (e.g., relaxed dropping rules), which may reduce a number of transmissions dropped by the UE. For example, if the UE detects a conflict between a transmission direction of a message and a transmission direction of a symbol in which the message is scheduled, the UE may transmit the message in accordance with the full-duplexing rules (e.g., instead of dropping the message), which may result in higher throughput and reduced latency at the UE, among other benefits.

Figure 4:
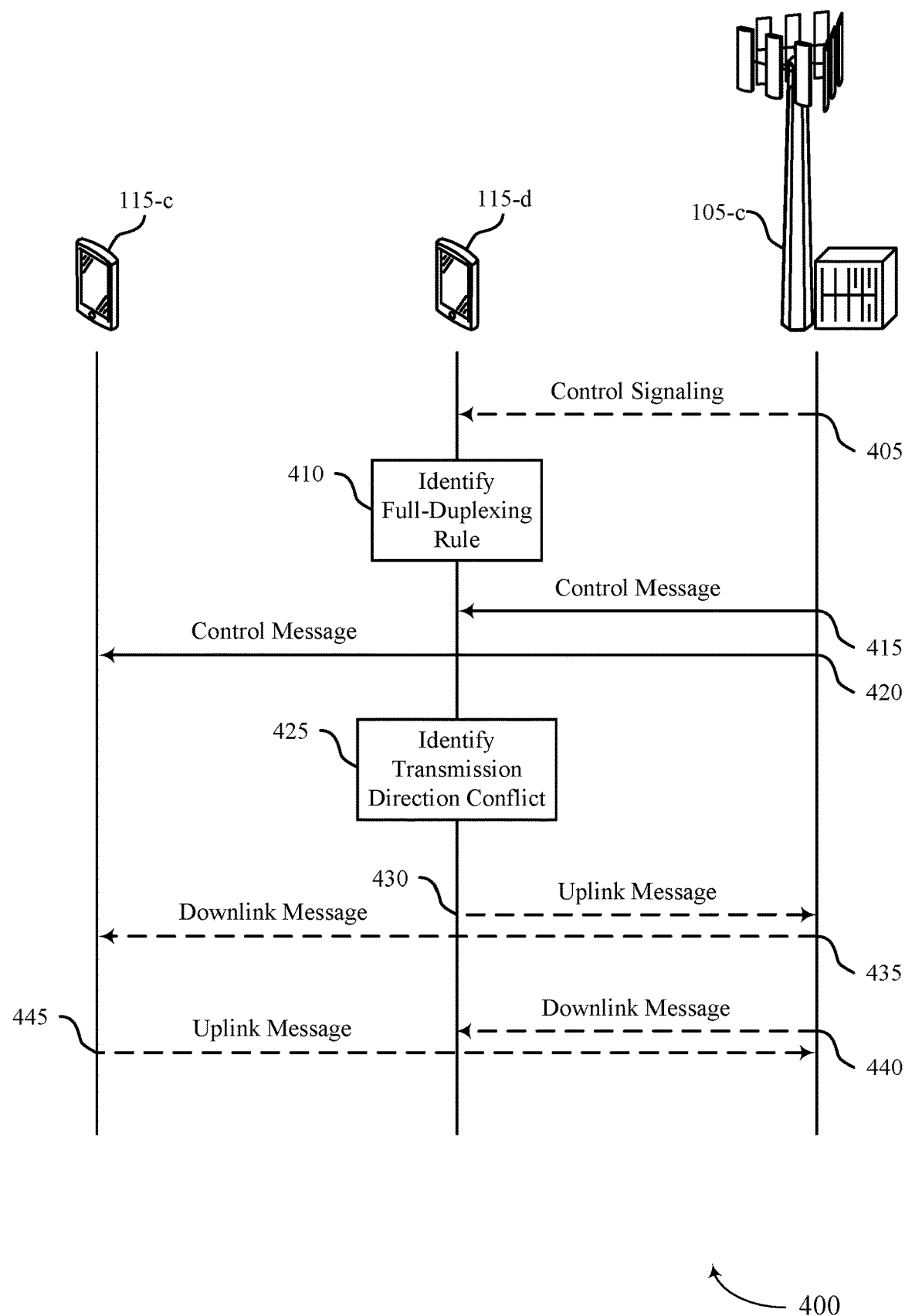
FIG. 4 illustrates an example of a process flow that supports techniques for managing transmission direction conflicts in accordance with aspects of the present disclosure.

FIG. 4 illustrates an example of a process flow 400 that supports techniques for managing transmission direction conflicts in accordance with aspects of the present disclosure. The process flow 400 may implement or be implemented by aspects of the wireless communications system 100 or the wireless communications system 200. For example, the process flow 400 may include a UE 115-c, a UE 115-d, and a base station 105-c, which may be examples of corresponding devices described with reference to FIGS. 1 and 2. In the following description of the process flow 400, operations between the UE 115-c, the UE 115-d, and the base station 105-c may be performed in a different order or at a different time than as shown. Additionally or alternatively, some operations may be omitted from the process flow 400, and other operations may be added to the process flow 400.

At 405, the base station 105-c may transmit control signaling to the UE 115-d. The control signaling may identify a full-duplexing rule (e.g., a relaxed dropping rule), as described with reference to FIGS. 2 and 3. The full-duplexing rule may indicate for the UE 115-d to refrain from using a transmission dropping rule for transmission direction conflicts that occur for a downlink symbol, an uplink symbol, a flexible symbol, a dedicated symbol, or any combination thereof. The control signaling may include an RRC message, a MAC-CE, or DCI. For example, the UE 115-d may receive DCI that includes a dynamic indication of the full-duplexing rule. In some examples, the control signaling may indicate a set of transmission dropping rules, a set of full-duplexing rules, or both. The control signaling may also indicate a capability of the base station 105-c to support full-duplex communications.

At 410, the UE 115-d may identify a full-duplexing rule (e.g., a relaxed dropping rule) that indicates to refrain from using a transmission dropping rule for transmission direction conflicts that occur between uplink and downlink transmissions in a same symbol. In some examples, the UE 115-d may identify the full-duplexing rule based on receiving control signaling from the base station 105-c. That is, the full-duplexing rule may be configured by the base station 105-c. In other examples, the UE 115-d may be preconfigured with the full-duplexing rule. In some examples, the full-duplexing rule may only be applicable to dedicated RRC downlink symbols.

At 415, the base station 105-c may transmit a first control message to the UE 115-d. The first control message may schedule transmission of a first message during a symbol. In some examples, there may be a transmission direction conflict between a first transmission direction of the message and a second transmission direction of the symbol. The base station 105-c may also transmit a second control message to the UE 115-c at 420. The second control message may schedule transmission of a second message during the symbol. In some examples, the first message and the second message may be associated with different transmission directions.

At 425, the UE 115-d may identify a transmission direction conflict between the first message and the symbol in which the first message is scheduled. For example, the UE 115-d may identify a transmission direction conflict between an uplink transmission direction of the first message (e.g., an SPS ACK or NACK message, a scheduling request, a configured grant uplink transmission, a dynamic grant uplink transmission) and a downlink transmission direction of the symbol. Alternatively, the UE 115-d may identify a transmission direction conflict between a downlink transmission of the first message (e.g., a downlink transmission on a CORESET, an SPS downlink transmission, a dynamic grant downlink transmission) and an uplink transmission direction of the symbol.

In other examples, the UE 115-d may identify a transmission direction conflict between a transmission direction of the first message (e.g., an SPS ACK or NACK message, a scheduling request, a configured grant transmission, an SPS transmission, a reference signal transmission) and a transmission direction of the symbol (e.g., an RRC flexible symbol). The UE 115-d may also identify a transmission direction conflict between a transmission direction of the first message (e.g., a configured grant uplink transmission, a dynamic grant uplink transmission) and a transmission direction of the symbol (e.g., an RRC downlink symbol) based on a reference CC of the symbol and a CC to be used for transmission of the first message. Similarly, the UE 115-d may identify a transmission direction conflict between a transmission direction of the first message (e.g., a configured grant downlink transmission, a dynamic grant downlink transmission) and a transmission direction of the symbol (e.g., an uplink symbol) based on a reference CC of the symbol and a CC to be used for transmission of the first message.

Accordingly, the base station 105-c and the UEs 115 may communicate during the symbol in accordance with the first control message and the second control message. For example, the base station 105-c may transmit a downlink message to the UE 115-c at 435 while simultaneously receiving an uplink message from the UE 115-d at 430. Alternatively, the base station 105-c may transmit a downlink message to the UE 115-d at 440 while simultaneously receiving an uplink message from the UE 115-c at 445. The UE 115-d may communicate the first message (e.g., an uplink message or a downlink message) during the symbol based on receiving an indication (e.g., from the base station 105-c) to refrain from dropping the first message.

The process flow 400 may support techniques for reduced latency, higher throughput, and more efficient utilization of communication resources, among other benefits. Specifically, the described techniques may provide for configuring the UE 115-d with full-duplexing rules (e.g., relaxed dropping rules), which may reduce a number of transmissions dropped by the UE 115-*d*. For example, if the UE 115-*d* detects a conflict between a transmission direction of a message and a transmission direction of a symbol in which the message is scheduled, the UE 115-*d* may transmit the message in accordance with full-duplexing rules (e.g., instead of dropping the message), which may result in higher throughput and reduced latency at the UE 115-*d*, among other benefits.

Figure 5:
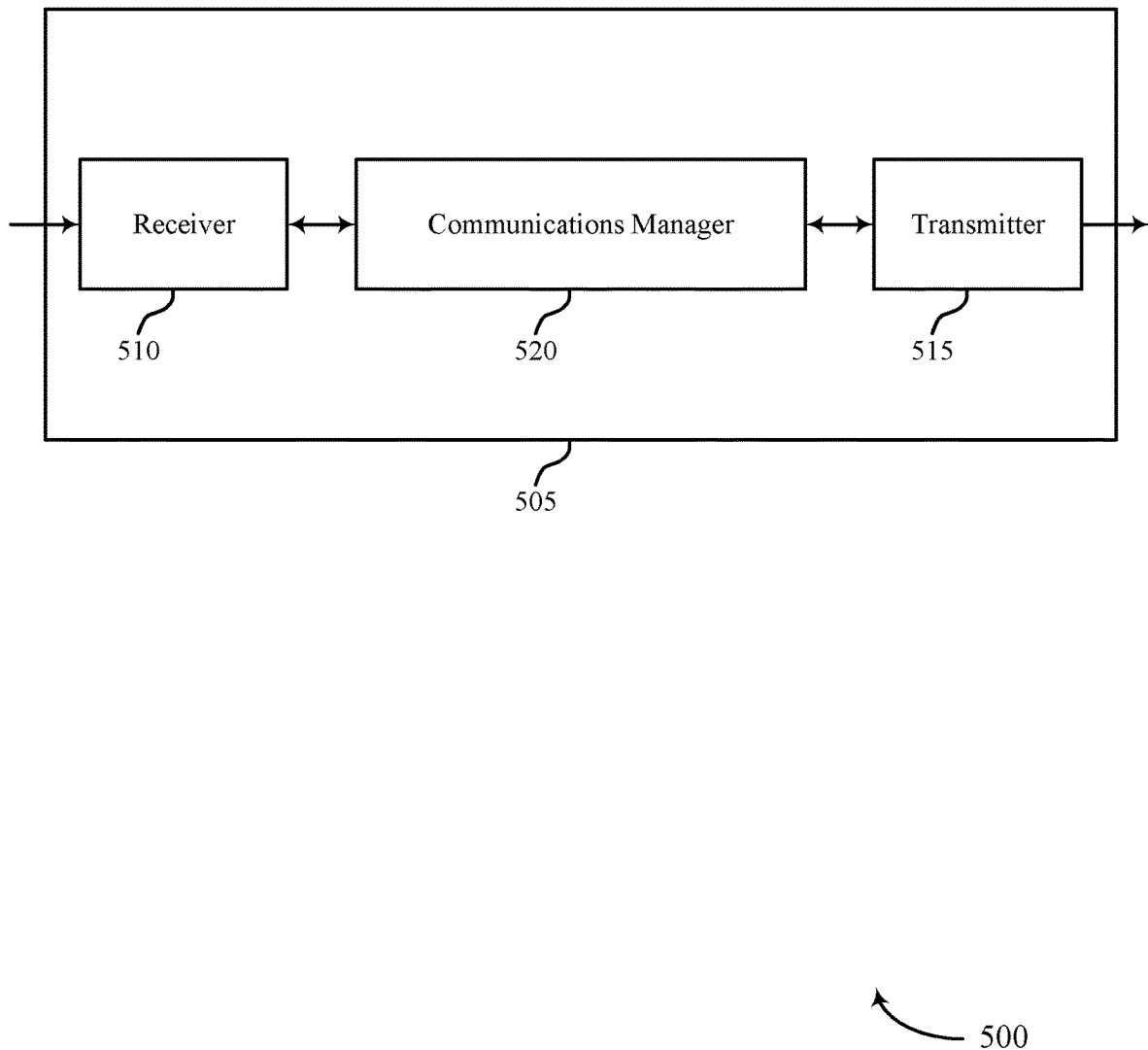
FIGS. 5 and 6 show block diagrams of devices that support techniques for managing transmission direction conflicts in accordance with aspects of the present disclosure.

FIG. 5 shows a block diagram 500 of a device 505 that supports techniques for managing transmission direction conflicts in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for managing transmission direction conflicts). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for managing transmission direction conflicts). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for managing transmission direction conflicts as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at the device 505 (e.g., a UE 115) in accordance with examples as disclosed herein. For example, the communications manager 520 may be configured as or otherwise support a means for identifying a full-duplexing rule that indicates to refrain from using a transmission dropping rule for transmission direction conflicts that occur between uplink and downlink transmissions in a same symbol. The communications manager 520 may be configured as or otherwise support a means for receiving, from a base station, a control message scheduling transmission of a message during a symbol, where a transmission direction conflict exists between a first transmission direction of the message and a second transmission direction of the symbol. The communications manager 520 may be configured as or otherwise support a means for communicating the message during the symbol based on the full-duplexing rule.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources based on using a full-duplexing rule to override (e.g., disregard) various transmission direction conflicts. For example, the device 505 may refrain from dropping an uplink transmission scheduled in a downlink symbol (or vice versa) based on a full-duplexing rule, which may enable the device 505 to utilize communication resources with greater efficiency.

Figure 6:
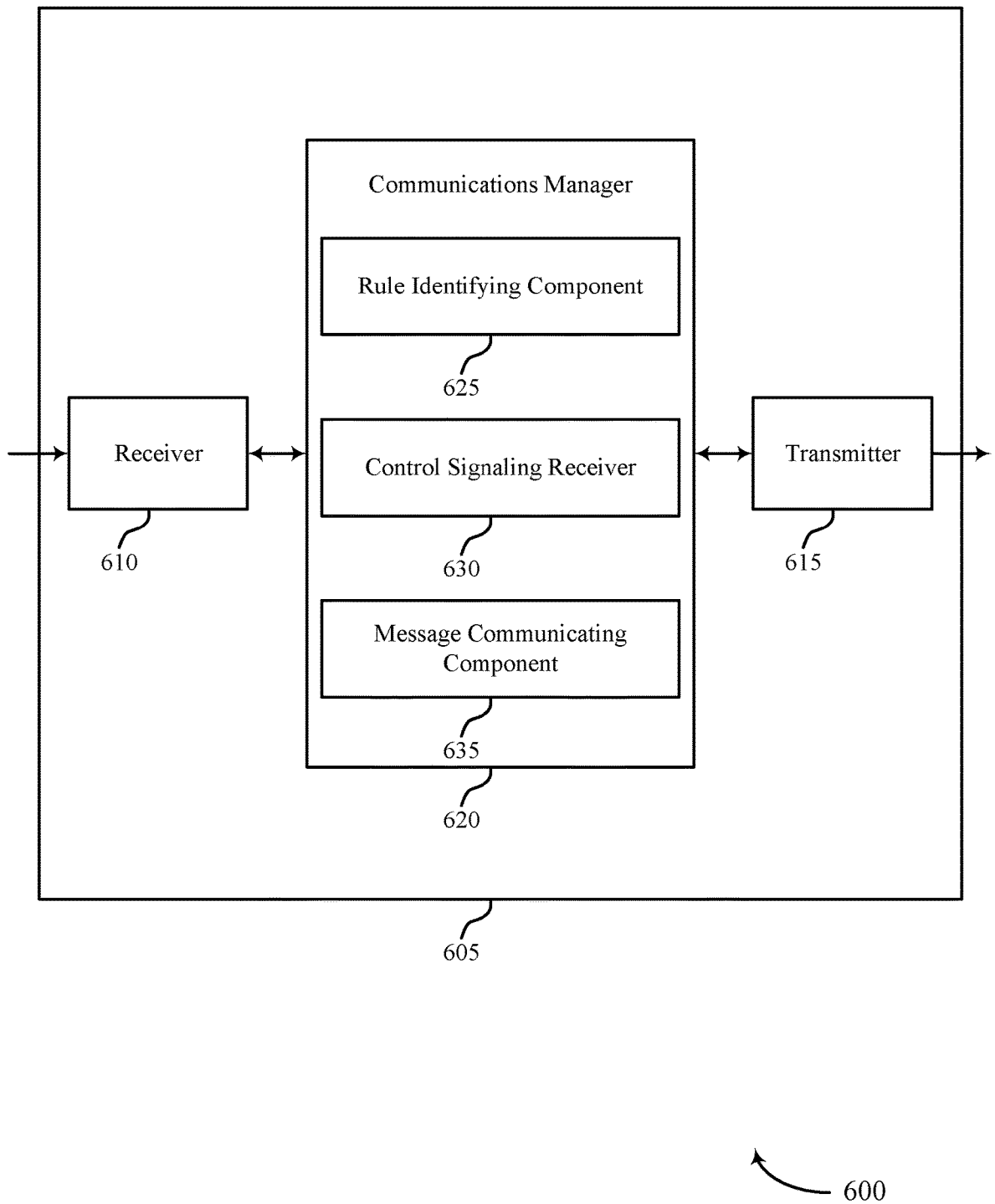

FIG. 6 shows a block diagram 600 of a device 605 that supports techniques for managing transmission direction conflicts in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for managing transmission direction conflicts). Information may be passed on to other components of the device 605. The receiver 610 may utilize a single antenna or a set of multiple antennas.

The transmitter 615 may provide a means for transmitting signals generated by other components of the device 605.

For example, the transmitter 615 may transmit information such as packets, user data, control information, or any combination thereof associated with various information channels (e.g., control channels, data channels, information channels related to techniques for managing transmission direction conflicts). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for managing transmission direction conflicts as described herein. For example, the communications manager 620 may include a rule identifying component 625, a control signaling receiver 630, a message communicating component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at the device 605 (e.g., a UE 115) in accordance with examples as disclosed herein. The rule identifying component 625 may be configured as or otherwise support a means for identifying a full-duplexing rule that indicates to refrain from using a transmission dropping rule for transmission direction conflicts that occur between uplink and downlink transmissions in a same symbol. The control signaling receiver 630 may be configured as or otherwise support a means for receiving, from a base station, a control message scheduling transmission of a message during a symbol, where a transmission direction conflict exists between a first transmission direction of the message and a second transmission direction of the symbol. The message communicating component 635 may be configured as or otherwise support a means for communicating the message during the symbol based on the full-duplexing rule.

Figure 7:
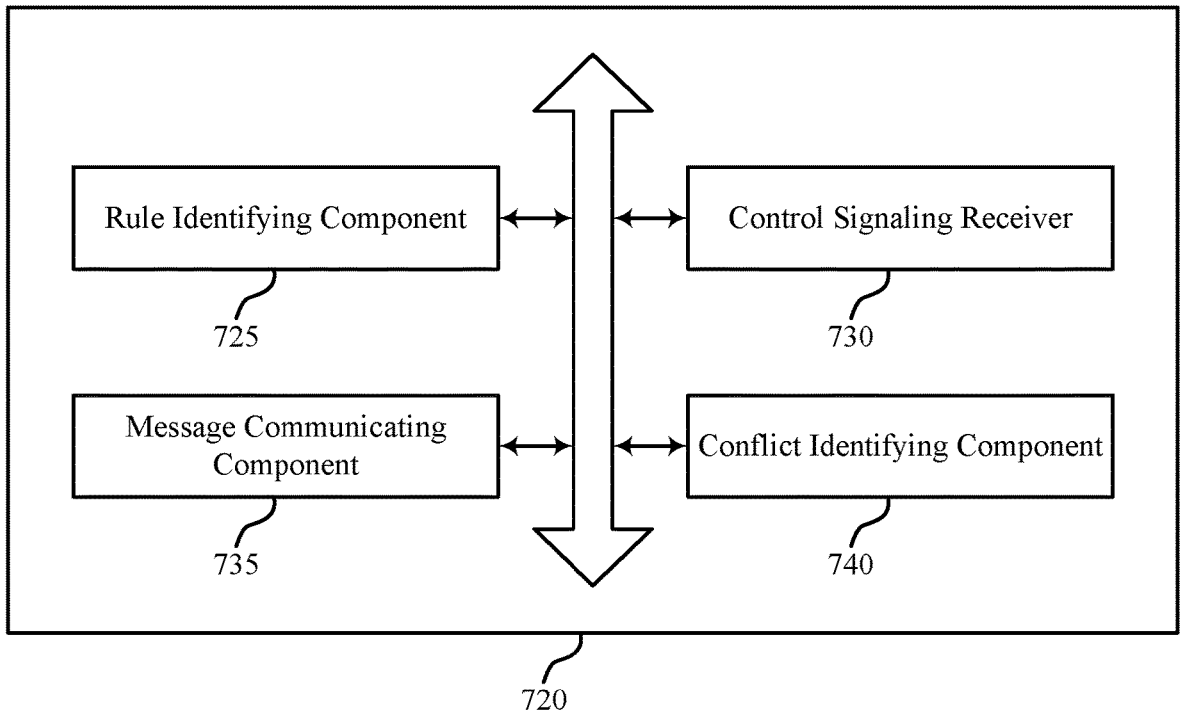
FIG. 7 shows a block diagram of a communications manager that supports techniques for managing transmission direction conflicts in accordance with aspects of the present disclosure.

FIG. 7 shows a block diagram 700 of a communications manager 720 that supports techniques for managing transmission direction conflicts in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for managing transmission direction conflicts as described herein. For example, the communications manager 720 may include a rule identifying component 725, a control signaling receiver 730, a message communicating component 735, a conflict identifying component 740, or any combination thereof. Each of these components may communicate, directly or indirectly, with one another (e.g., via one or more buses).

The communications manager 720 may support wireless communications at the device 705 (e.g., a UE 115) in accordance with examples as disclosed herein. The rule identifying component 725 may be configured as or otherwise support a means for identifying a full-duplexing rule that indicates to refrain from using a transmission dropping rule for transmission direction conflicts that occur between uplink and downlink transmissions in a same symbol. The control signaling receiver 730 may be configured as or otherwise support a means for receiving, from a base station, a control message scheduling transmission of a message during a symbol, where a transmission direction conflict exists between a first transmission direction of the message and a second transmission direction of the symbol. The message communicating component 735 may be configured as or otherwise support a means for communicating the message during the symbol based on the full-duplexing rule.

In some examples, the control signaling receiver 730 may be configured as or otherwise support a means for receiving, from the base station, control signaling identifying the full-duplexing rule that indicates for the device 705 to refrain from using the transmission dropping rule for transmission direction conflicts that occur for a downlink symbol, for an uplink symbol, for a flexible symbol, for a dedicated symbol, or any combination thereof, where communicating the message during the symbol is based on the device 705 refraining from using the transmission dropping rule. In some examples, the control signaling, the control message, or both include one or more of an RRC message, a MAC-CE, or an instance of DCI.

In some examples, to support communicating the message during the symbol, the message communicating component 735 may be configured as or otherwise support a means for communicating the message during the symbol based on the control message identifying the full-duplexing rule that indicates for the device 705 to refrain from using the transmission dropping rule.

In some examples, the control signaling receiver 730 may be configured as or otherwise support a means for receiving, from the base station, control signaling indicating a set of transmission dropping rules including the transmission dropping rule and a set of full-duplexing rules including the full-duplexing rule, where communicating the message during the symbol is based on the control signaling.

In some examples, to support identifying the full-duplexing rule, the rule identifying component 725 may be configured as or otherwise support a means for identifying the full-duplexing rule that corresponds to a downlink symbol, an uplink symbol, a flexible symbol, a dedicated symbol, a dedicated RRC downlink symbol, or any combination thereof.

In some examples, the control signaling receiver 730 may be configured as or otherwise support a means for receiving, from the base station, control signaling indicating a capability of the base station to support full-duplex communications, where communicating the message during the symbol is based on the capability of the base station to support full-duplex communications.

In some examples, the conflict identifying component 740 may be configured as or otherwise support a means for identifying the transmission direction conflict between an uplink transmission direction of the message and an RRC downlink transmission direction of the symbol, where the message includes a semi-persistent ACK or NACK message, a scheduling request, a configured grant uplink transmission, a dynamic grant uplink transmission, or any combination thereof.

In some examples, the conflict identifying component 740 may be configured as or otherwise support a means for identifying the transmission direction conflict between a downlink transmission direction of the message and an RRC uplink transmission direction of the symbol, where the message includes a downlink transmission on a CORESET, a semi-persistent downlink transmission, a dynamic grant downlink transmission, or any combination thereof.

In some examples, the conflict identifying component 740 may be configured as or otherwise support a means for identifying the transmission direction conflict between an uplink or downlink transmission direction of the message and a downlink or uplink transmission direction of the symbol that is an RRC flexible symbol, where the message includes a semi-persistent ACK or NACK message, a scheduling request, a configured grant transmission, a semi-persistent transmission, a reference signal transmission, or any combination thereof.

In some examples, the conflict identifying component 740 may be configured as or otherwise support a means for identifying the transmission direction conflict between the first transmission direction of the message and the second transmission direction of the symbol based on an SFI configuration of the symbol, where the message includes a transmission on a CORESET and the symbol includes an SFI uplink symbol or an SFI flexible symbol.

In some examples, the conflict identifying component 740 may be configured as or otherwise support a means for identifying the transmission direction conflict between the first transmission direction of the message and the second transmission direction of the symbol based on a first reference CC of the symbol and a second CC to be used for transmission of the message, the symbol including an RRC downlink symbol, the message including a configured grant uplink transmission, a dynamic grant uplink transmission, or both.

In some examples, the conflict identifying component 740 may be configured as or otherwise support a means for identifying the transmission direction conflict between the first transmission direction of the message and the second transmission direction of the symbol based on a reference CC of the symbol and a CC to be used for transmission of the message, the symbol including an uplink symbol, the message including a configured grant downlink transmission, a dynamic grant downlink transmission, or any combination thereof.

In some examples, the control signaling receiver 730 may be configured as or otherwise support a means for receiving, from the base station, DCI that includes a dynamic indication of the full-duplexing rule. In some examples, the device 705 may be preconfigured with the full-duplexing rule. In some examples, the full-duplexing rule is configured by the base station. In some examples, the full-duplexing rule is applicable to dedicated RRC downlink symbols. In some examples, the symbol includes an RRC downlink symbol, a dedicated RRC downlink symbol, a common RRC downlink symbol, an RRC downlink symbol configured by the base station, or a combination thereof.

Figure 8:
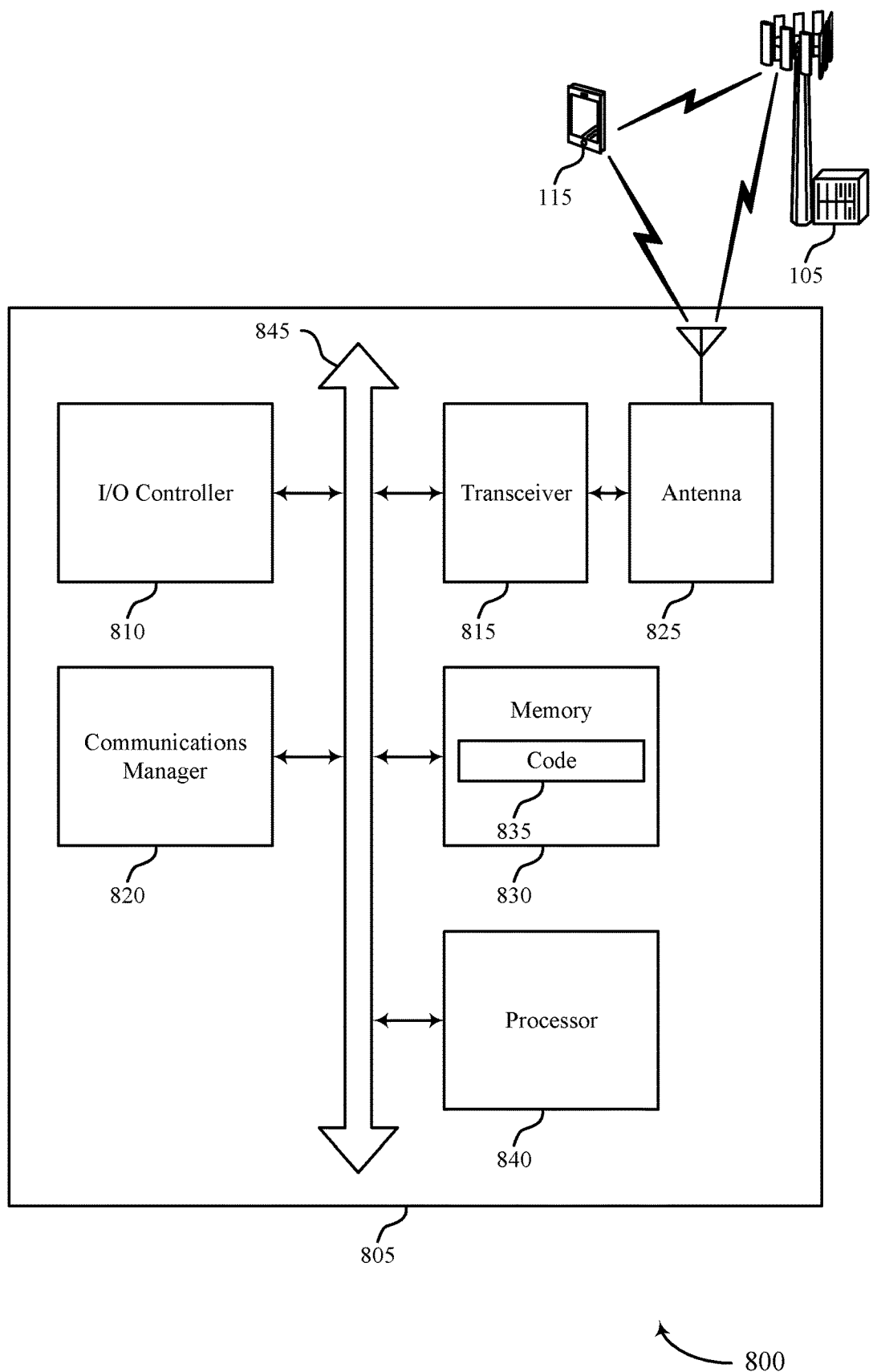
FIG. 8 shows a diagram of a system including a device that supports techniques for managing transmission direction conflicts in accordance with aspects of the present disclosure.

FIG. 8 shows a diagram of a system 800 including a device 805 that supports techniques for managing transmission direction conflicts in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for managing transmission direction conflicts). For example, the device 805 or a component of the device 805 may include a processor 840 and memory 830 coupled to the processor 840, the processor 840 and memory 830 configured to perform various functions described herein.

The communications manager 820 may support wireless communications at the device 805 (e.g., a UE 115) in accordance with examples as disclosed herein. For example, the communications manager 820 may be configured as or otherwise support a means for identifying a full-duplexing rule that indicates to refrain from using a transmission dropping rule for transmission direction conflicts that occur between uplink and downlink transmissions in a same symbol. The communications manager 820 may be configured as or otherwise support a means for receiving, from a base station, a control message scheduling transmission of a message during a symbol, where a transmission direction conflict exists between a first transmission direction of the message and a second transmission direction of the symbol. The communications manager 820 may be configured as or otherwise support a means for communicating the message during the symbol based on the full-duplexing rule.

By including or configuring the communications manager 820 in accordance with examples as described herein, the device 805 may support techniques for reduced latency and higher throughput based on using a full-duplexing rule to override various transmission dropping rules. For example, the device 805 may refrain from dropping a downlink transmission scheduled in an uplink symbol based on a full-duplexing rule. As a result, the device 805 may experience higher throughput, reduced latency, and improved communication reliability, among other benefits.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for managing transmission direction conflicts as described herein, or the processor 840 and the memory 830 may be otherwise configured to perform or support such operations.

Figure 9:
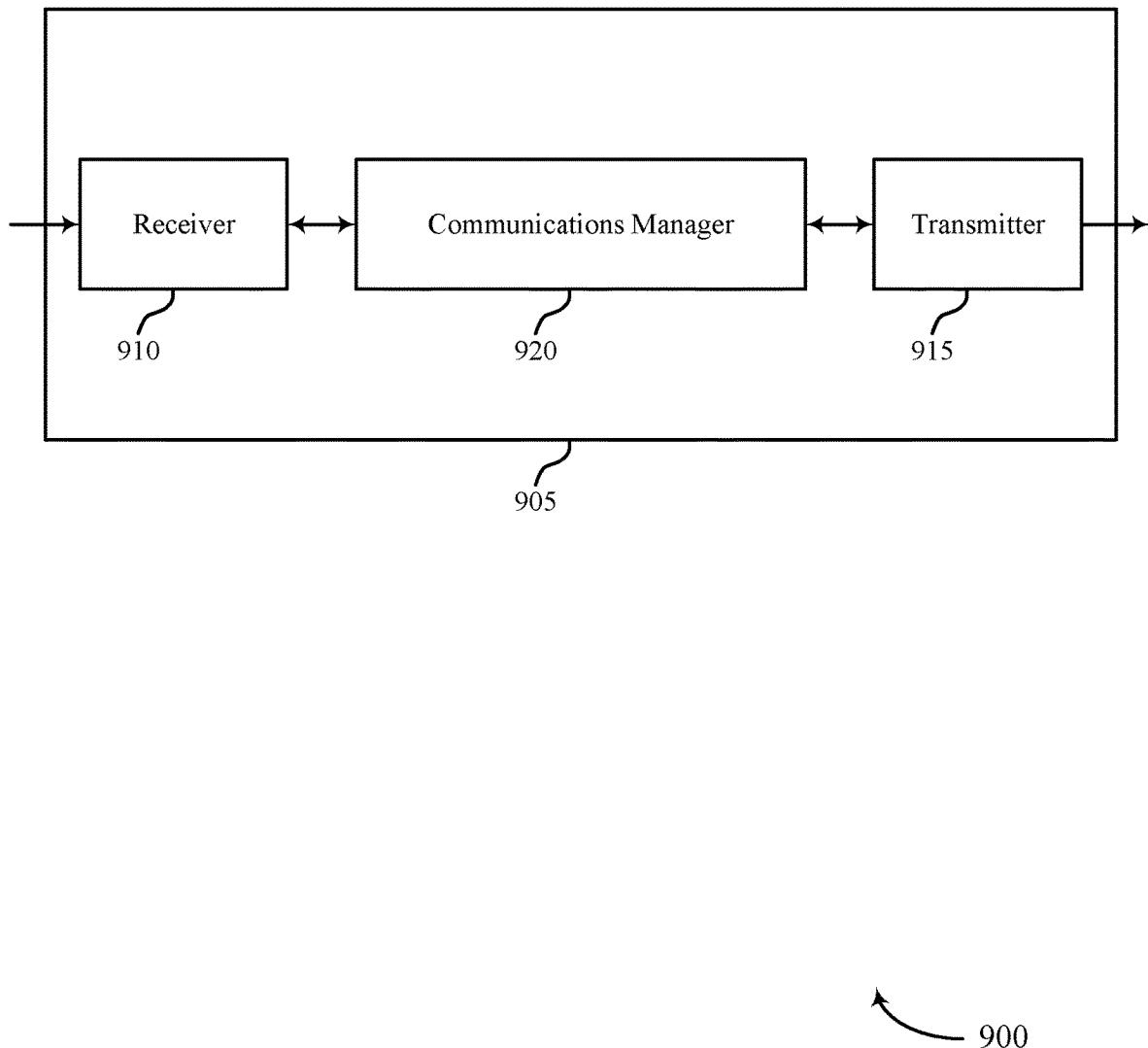
FIGS. 9 and 10 show block diagrams of devices that support techniques for managing transmission direction conflicts in accordance with aspects of the present disclosure.

FIG. 9 shows a block diagram 900 of a device 905 that supports techniques for managing transmission direction conflicts in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for managing transmission direction conflicts). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for managing transmission direction conflicts). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for managing transmission direction conflicts as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at the device 905 (e.g., a base station 105) in accordance with examples as disclosed herein. For example, the communications manager 920 may be configured as or otherwise support a means for identifying a full-duplexing rule that indicates to refrain from using a transmission dropping rule for transmission direction conflicts that occur between uplink and downlink transmissions in a same symbol. The communications manager 920 may be configured as or otherwise support a means for transmitting, to a UE, a control message scheduling transmission of a message during a symbol, where a transmission direction conflict exists between a first transmission direction of the message and a second transmission direction of the symbol. The communications manager 920 may be configured as or otherwise support a means for communicating the message during the symbol based on the full-duplexing rule and the control message.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient utilization of communication resources by using a full-duplexing rule to override (e.g., disregard) transmission direction conflicts. For example, the described techniques may enable the device 905 to transmit a message during a symbol even if there is a transmission direction conflict between the message and the symbol. As such, the device 905 may drop fewer scheduled transmissions, which may enable the device 905 to utilize communication resources with greater efficiency, among other benefits.

Figure 10:
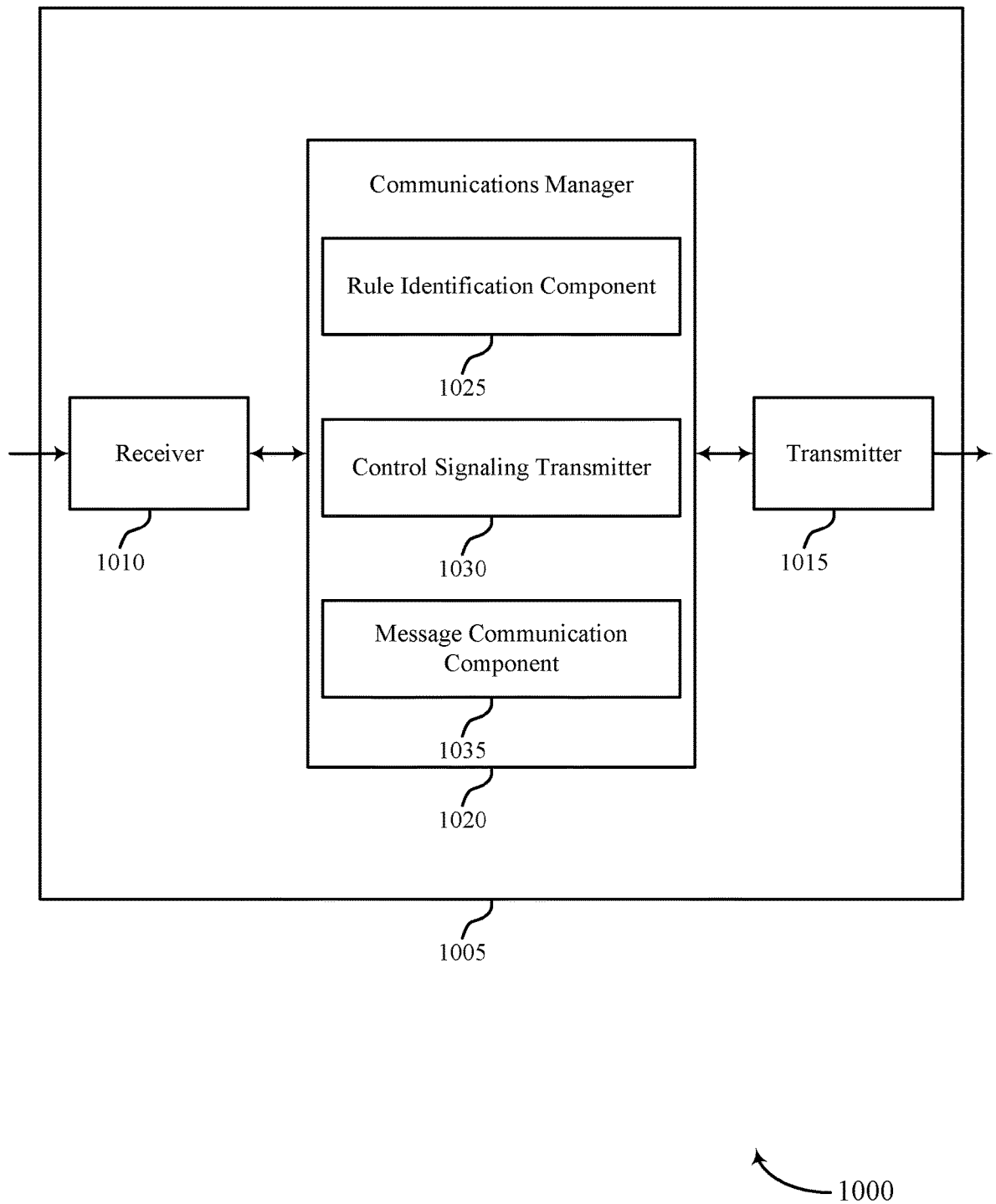

FIG. 10 shows a block diagram 1000 of a device 1005 that supports techniques for managing transmission direction conflicts in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for managing transmission direction conflicts). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for managing transmission direction conflicts). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for managing transmission direction conflicts as described herein. For example, the communications manager 1020 may include a rule identification component 1025, a control signaling transmitter 1030, a message communication component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at the device 1005 (e.g., a base station 105) in accordance with examples as disclosed herein. The rule identification component 1025 may be configured as or otherwise support a means for identifying a full-duplexing rule that indicates to refrain from using a transmission dropping rule for transmission direction conflicts that occur between uplink and downlink transmissions in a same symbol. The control signaling transmitter 1030 may be configured as or otherwise support a means for transmitting, to a UE, a control message scheduling transmission of a message during a symbol, where a transmission direction conflict exists between a first transmission direction of the message and a second transmission direction of the symbol. The message communication component 1035 may be configured as or otherwise support a means for communicating the message during the symbol based on the full-duplexing rule and the control message.

Figure 11:
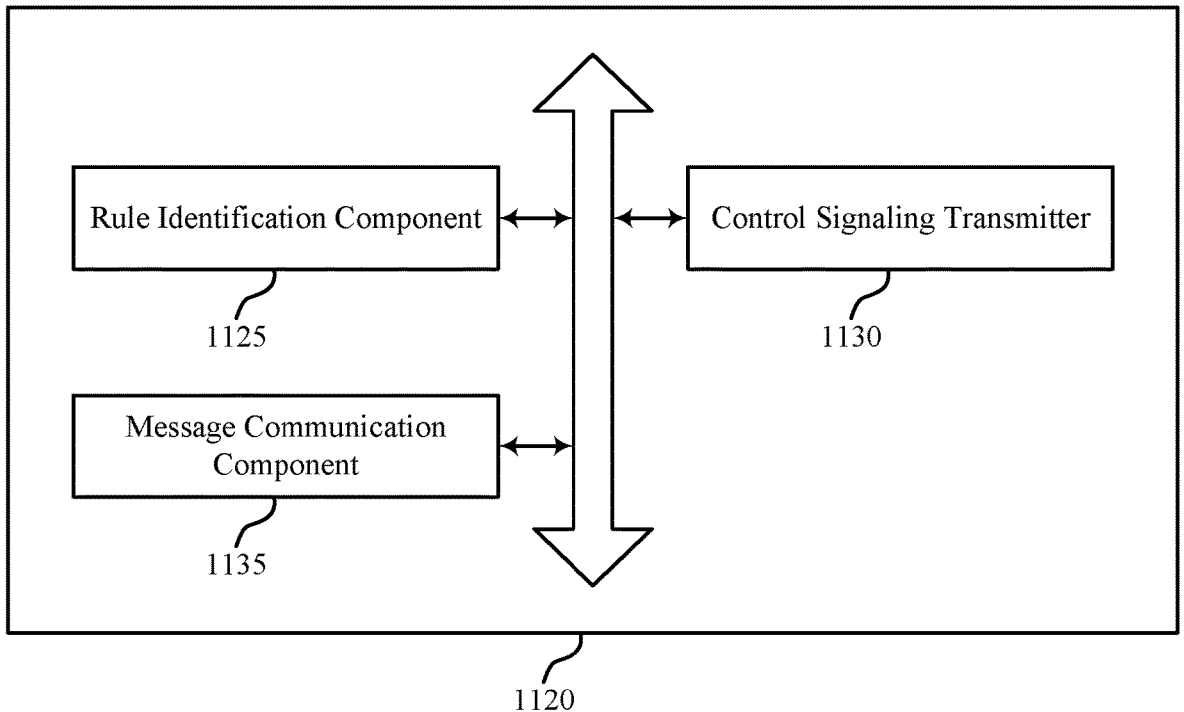
FIG. 11 shows a block diagram of a communications manager that supports techniques for managing transmission direction conflicts in accordance with aspects of the present disclosure.

FIG. 11 shows a block diagram 1100 of a communications manager 1120 that supports techniques for managing transmission direction conflicts in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for managing transmission direction conflicts as described herein. For example, the communications manager 1120 may include a rule identification component 1125, a control signaling transmitter 1130, a message communication component 1135, or any combination thereof. Each of these components may communicate, directly or indirectly, with one another (e.g., via one or more buses).

The communications manager 1120 may support wireless communications at the device 1105 (e.g., a base station 105) in accordance with examples as disclosed herein. The rule identification component 1125 may be configured as or otherwise support a means for identifying a full-duplexing rule that indicates to refrain from using a transmission dropping rule for transmission direction conflicts that occur between uplink and downlink transmissions in a same symbol. The control signaling transmitter 1130 may be configured as or otherwise support a means for transmitting, to a UE, a control message scheduling transmission of a message during a symbol, where a transmission direction conflict exists between a first transmission direction of the message and a second transmission direction of the symbol. The message communication component 1135 may be configured as or otherwise support a means for communicating the message during the symbol based on the full-duplexing rule and the control message.

In some examples, the control signaling transmitter 1130 may be configured as or otherwise support a means for transmitting control signaling identifying the full-duplexing rule that indicates for the UE to refrain from using the transmission dropping rule when the transmission direction conflict occurs for a downlink symbol, for an uplink symbol, for a flexible symbol, for a dedicated symbol, or any combination thereof, where communicating the message during the symbol is based on the UE refraining from using the transmission dropping rule.

In some examples, to support communicating the message during the symbol, the message communication component 1135 may be configured as or otherwise support a means for communicating the message during the symbol based on the control message identifying the full-duplexing rule that indicates for the UE to refrain from using the transmission dropping rule.

In some examples, the control signaling transmitter 1130 may be configured as or otherwise support a means for transmitting control signaling indicating a set of transmission dropping rules including the transmission dropping rule and a set of full-duplexing rules including the full-duplexing rule, where communicating the message during the symbol is based on the control signaling. In some examples, the set of transmission dropping rules, the set of full-duplexing rules, or both correspond to one or more dedicated RRC downlink symbols.

In some examples, to support transmitting the control message, the control signaling transmitter 1130 may be configured as or otherwise support a means for transmitting, to the UE, control signaling indicating a capability of the device 1105 to support full-duplex communications, where communicating the message during the symbol is based on the capability of the device 1105 to support full-duplex communications.

In some examples, to support communicating the message during the symbol, the message communication component 1135 may be configured as or otherwise support a means for receiving the message from the UE during the symbol based on the control message, where the symbol includes an RRC downlink symbol and the message includes a semi-persistent ACK or NACK message, a scheduling request, a configured grant transmission, a semi-persistent transmission, a reference signal transmission, or any combination thereof. In some examples, to support communicating the message during the symbol, the message communication component 1135 may be configured as or otherwise support a means for transmitting a second message to a second UE during the symbol in accordance with a full-duplex communication scheme.

In some examples, to support communicating the message during the symbol, the message communication component 1135 may be configured as or otherwise support a means for transmitting the message to the UE during the symbol based on the control message, where the symbol includes an RRC uplink symbol and the message includes a downlink transmission on a CORESET, a semi-persistent downlink transmission, a dynamic grant downlink transmission, or any combination thereof. In some examples, to support communicating the message during the symbol, the message communication component 1135 may be configured as or otherwise support a means for receiving a second message from a second UE during the symbol in accordance with a full-duplex communication scheme.

In some examples, to support communicating the message during the symbol, the message communication component 1135 may be configured as or otherwise support a means for communicating the message during the symbol based on the control message, where the symbol includes an RRC flexible symbol and the message includes a semi-persistent ACK or NACK message, a scheduling request, a configured grant transmission, a semi-persistent transmission, a reference signal transmission, or any combination thereof. In some examples, the full-duplexing rule is based on a scheduling alignment of common RRC downlink symbols for a set of multiple base stations including the device 1105.

Figure 12:
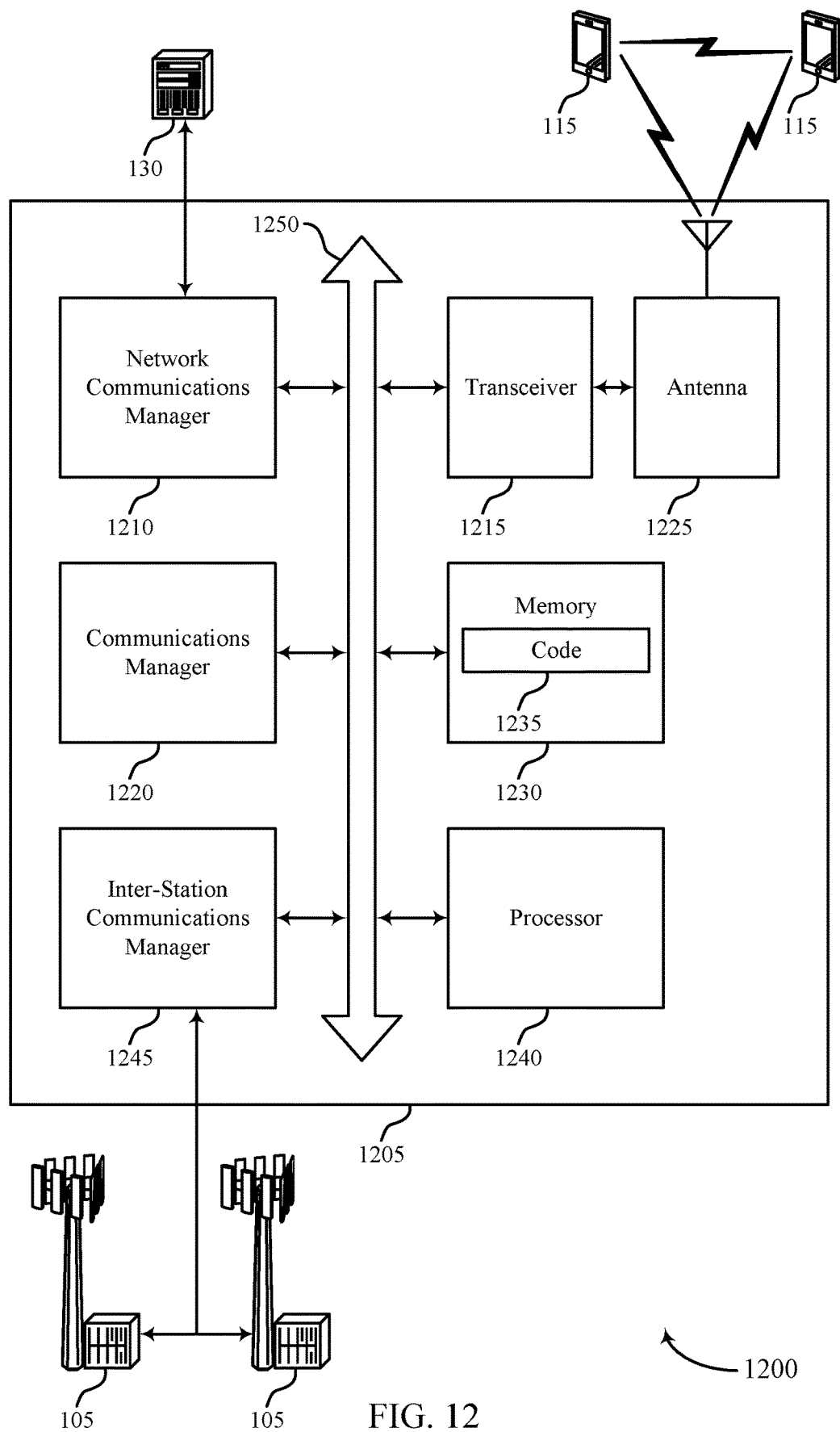
FIG. 12 shows a diagram of a system including a device that supports techniques for managing transmission direction conflicts in accordance with aspects of the present disclosure.

FIG. 12 shows a diagram of a system 1200 including a device 1205 that supports techniques for managing transmission direction conflicts in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for managing transmission direction conflicts). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at the device 1205 (e.g., a base station 105) in accordance with examples as disclosed herein. For example, the communications manager 1220 may be configured as or otherwise support a means for identifying a full-duplexing rule that indicates to refrain from using a transmission dropping rule for transmission direction conflicts that occur between uplink and downlink transmissions in a same symbol. The communications manager 1220 may be configured as or otherwise support a means for transmitting, to a UE, a control message scheduling transmission of a message during a symbol, where a transmission direction conflict exists between a first transmission direction of the message and a second transmission direction of the symbol. The communications manager 1220 may be configured as or otherwise support a means for communicating the message during the symbol based on the full-duplexing rule and the control message.

By including or configuring the communications manager 1220 in accordance with examples as described herein, the device 1205 may support techniques for higher throughput and reduced latency by using a full-duplexing rule to override (e.g., mitigate) transmission direction conflicts. For example, the described techniques may enable the device 1205 to transmit a message during a symbol, even if there is a transmission direction conflict between the message and the symbol. As a result, the device 1205 may drop fewer transmissions, which may enable the device 1205 to attain higher throughput and reduced latency, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for managing transmission direction conflicts as described herein, or the processor 1240 and the memory 1230 may be otherwise configured to perform or support such operations.

Figure 13:
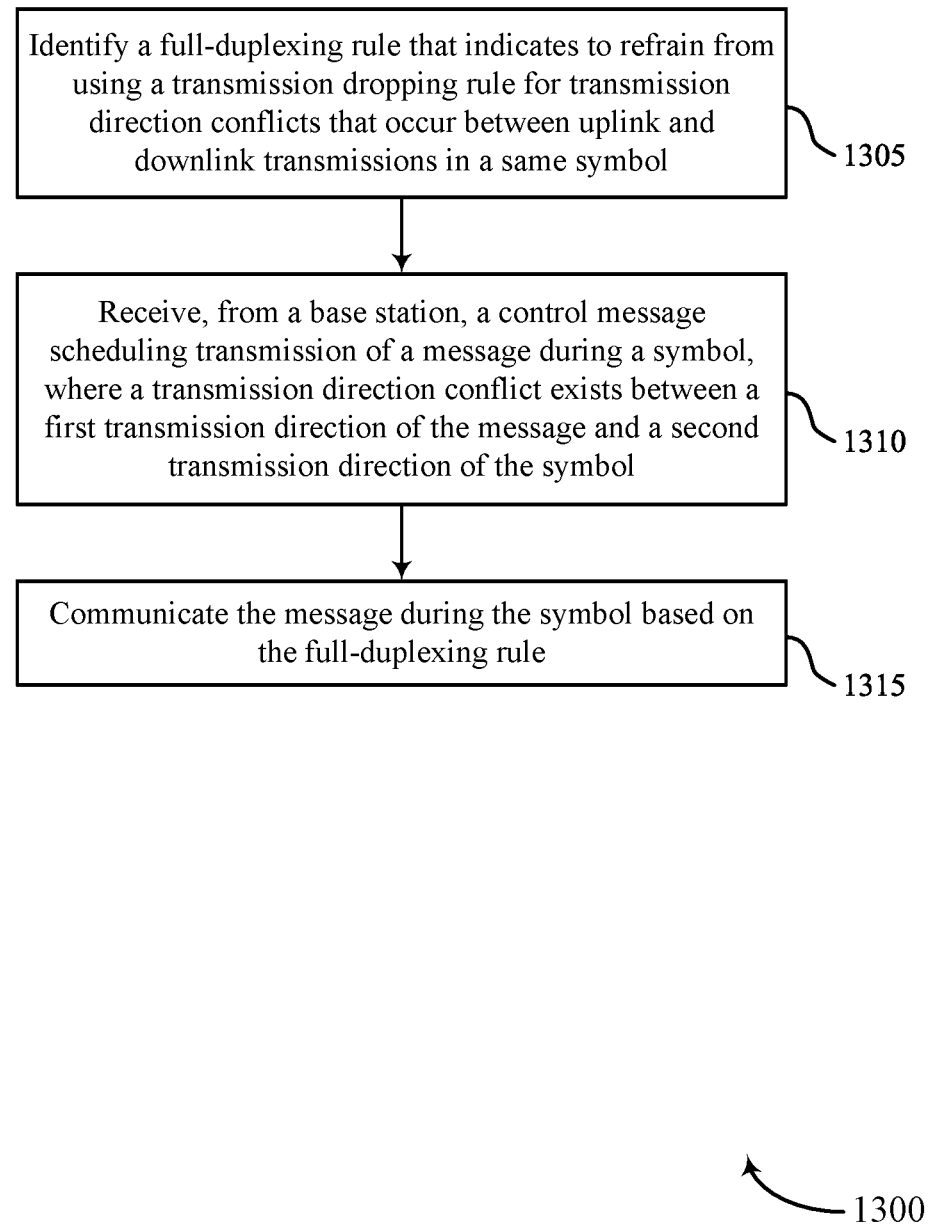
FIGS. 13 through 16 show flowcharts illustrating methods that support techniques for managing transmission direction conflicts in accordance with aspects of the present disclosure.

FIG. 13 shows a flowchart illustrating a method 1300 that supports techniques for managing transmission direction conflicts in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include identifying a full-duplexing rule that indicates to refrain from using a transmission dropping rule for transmission direction conflicts that occur between uplink and downlink transmissions in a same symbol. The operations of 1305 may be performed in accordance with examples as disclosed herein. In some examples, aspects of the operations of 1305 may be performed by a rule identifying component 725 as described with reference to FIG. 7.

At 1310, the method may include receiving, from a base station, a control message scheduling transmission of a message during a symbol, where a transmission direction conflict exists between a first transmission direction of the message and a second transmission direction of the symbol. The operations of 1310 may be performed in accordance with examples as disclosed herein. In some examples, aspects of the operations of 1310 may be performed by a control signaling receiver 730 as described with reference to FIG. 7.

At 1315, the method may include communicating the message during the symbol based on the full-duplexing rule. The operations of 1315 may be performed in accordance with examples as disclosed herein. In some examples, aspects of the operations of 1315 may be performed by a message communicating component 735 as described with reference to FIG. 7.

Figure 14:
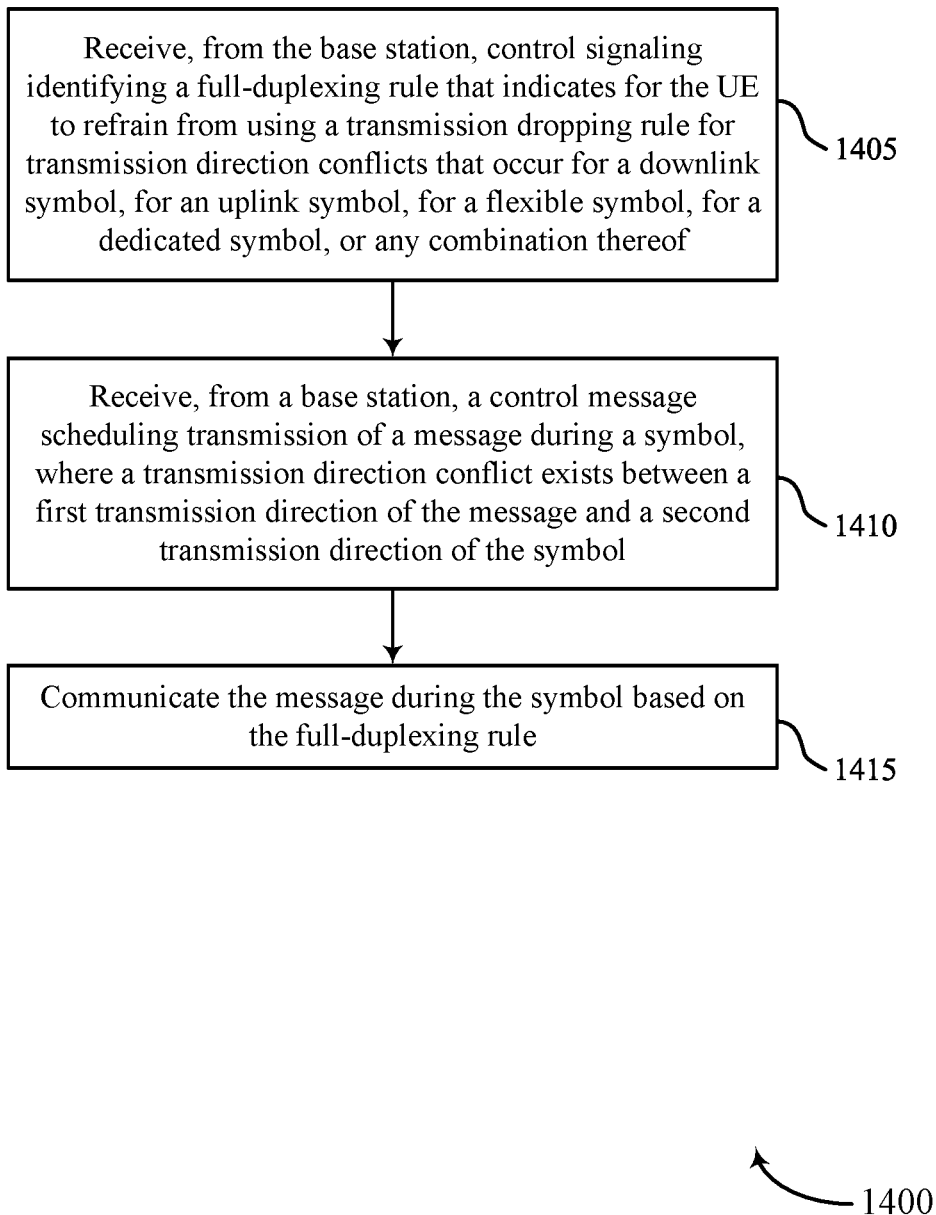

FIG. 14 shows a flowchart illustrating a method 1400 that supports techniques for managing transmission direction conflicts in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling identifying a full-duplexing rule that indicates for the UE to refrain from using a transmission dropping rule for transmission direction conflicts that occur for a downlink symbol, for an uplink symbol, for a flexible symbol, for a dedicated symbol, or any combination thereof. The operations of 1405 may be performed in accordance with examples as disclosed herein. In some examples, aspects of the operations of 1405 may be performed by a control signaling receiver 730 as described with reference to FIG. 7.

At 1410, the method may include receiving, from the base station, a control message scheduling transmission of a message during a symbol, where a transmission direction conflict exists between a first transmission direction of the message and a second transmission direction of the symbol. The operations of 1410 may be performed in accordance with examples as disclosed herein. In some examples, aspects of the operations of 1410 may be performed by a control signaling receiver 730 as described with reference to FIG. 7.

At 1415, the method may include communicating the message during the symbol based on the full-duplexing rule. The operations of 1415 may be performed in accordance with examples as disclosed herein. In some examples, aspects of the operations of 1415 may be performed by a message communicating component 735 as described with reference to FIG. 7.

Figure 15:
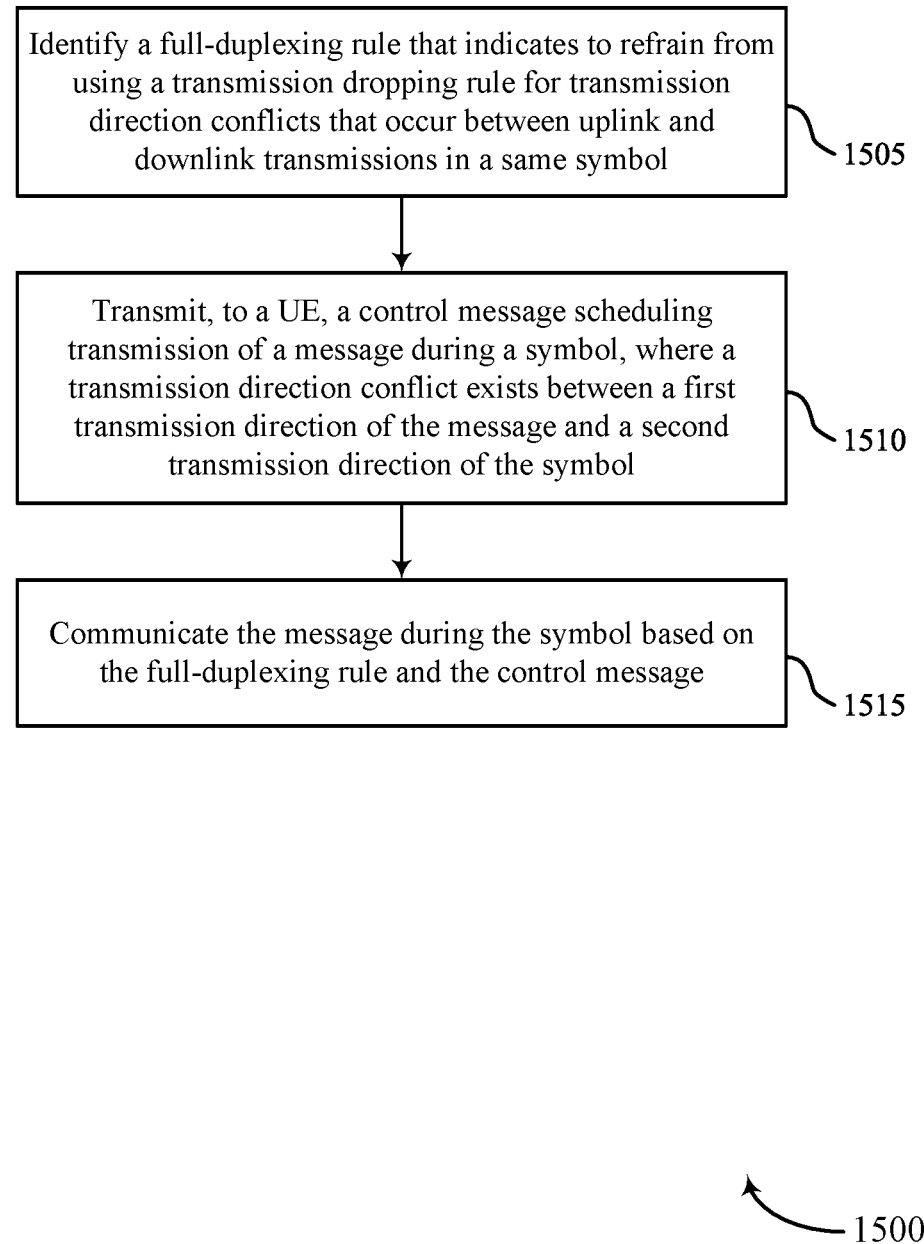

FIG. 15 shows a flowchart illustrating a method 1500 that supports techniques for managing transmission direction conflicts in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1505, the method may include identifying a full-duplexing rule that indicates to refrain from using a transmission dropping rule for transmission direction conflicts that occur between uplink and downlink transmissions in a same symbol. The operations of 1505 may be performed in accordance with examples as disclosed herein. In some examples, aspects of the operations of 1505 may be performed by a rule identification component 1125 as described with reference to FIG. 11.

At 1510, the method may include transmitting, to a UE, a control message scheduling transmission of a message during a symbol, where a transmission direction conflict exists between a first transmission direction of the message and a second transmission direction of the symbol. The operations of 1510 may be performed in accordance with examples as disclosed herein. In some examples, aspects of the operations of 1510 may be performed by a control signaling transmitter 1130 as described with reference to FIG. 11.

At 1515, the method may include communicating the message during the symbol based on the full-duplexing rule and the control message. The operations of 1515 may be performed in accordance with examples as disclosed herein. In some examples, aspects of the operations of 1515 may be performed by a message communication component 1135 as described with reference to FIG. 11.

Figure 16:
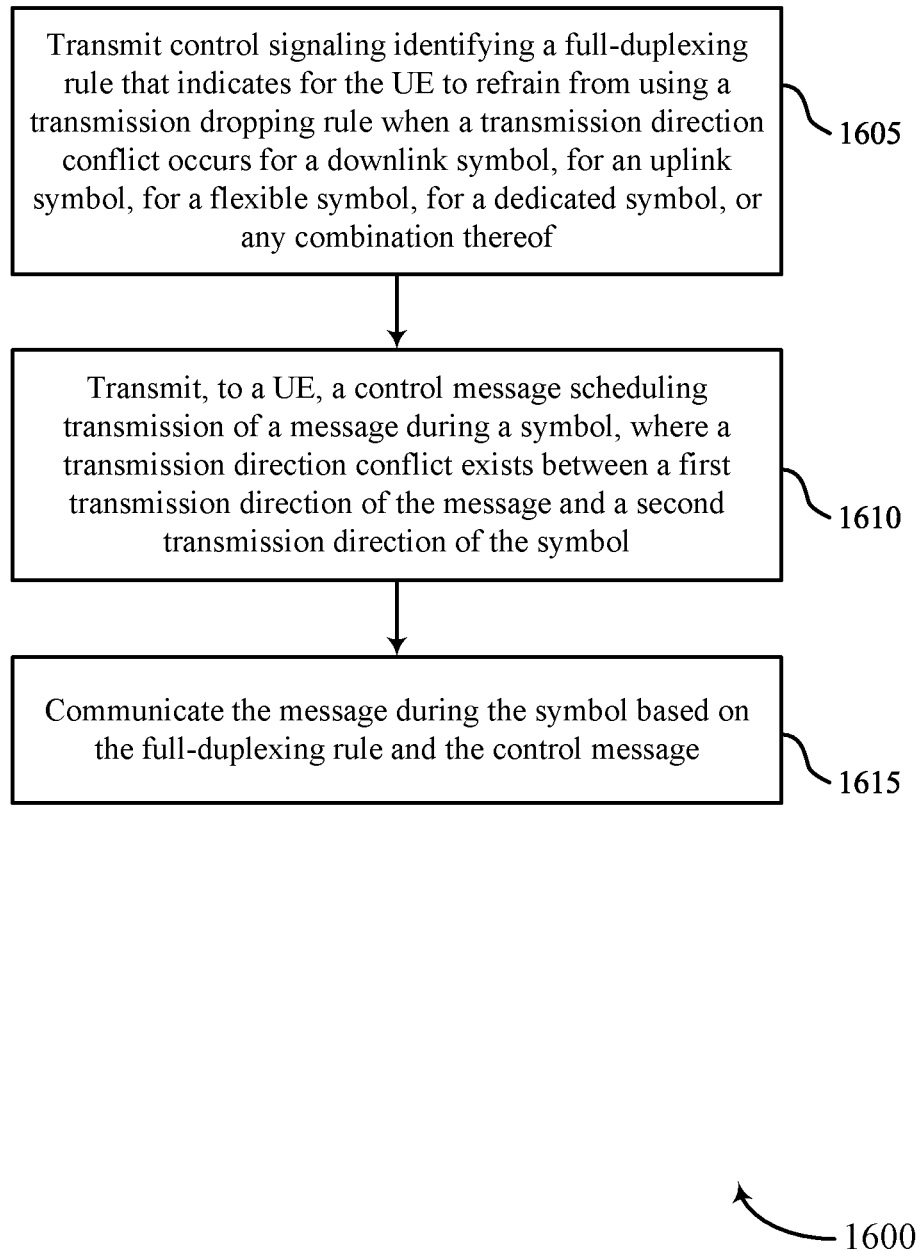

FIG. 16 shows a flowchart illustrating a method 1600 that supports techniques for managing transmission direction conflicts in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting control signaling identifying a full-duplexing rule that indicates for a UE to refrain from using a transmission dropping rule when a transmission direction conflict occurs for a downlink symbol, for an uplink symbol, for a flexible symbol, for a dedicated symbol, or any combination thereof. The operations of 1605 may be performed in accordance with examples as disclosed herein. In some examples, aspects of the operations of 1605 may be performed by a control signaling transmitter 1130 as described with reference to FIG. 11.

At 1610, the method may include transmitting, to the UE, a control message scheduling transmission of a message during a symbol, where a transmission direction conflict exists between a first transmission direction of the message and a second transmission direction of the symbol. The operations of 1610 may be performed in accordance with examples as disclosed herein. In some examples, aspects of the operations of 1610 may be performed by a control signaling transmitter 1130 as described with reference to FIG. 11.

At 1615, the method may include communicating the message during the symbol based on the full-duplexing rule and the control message. The operations of 1615 may be performed in accordance with examples as disclosed herein. In some examples, aspects of the operations of 1615 may be performed by a message communication component 1135 as described with reference to FIG. 11.

The following provides an overview of aspects of the present disclosure:

Aspect 1: A method for wireless communications at a UE, comprising: identifying a full-duplexing rule that indicates to refrain from using a transmission dropping rule for transmission direction conflicts that occur between uplink and downlink transmissions in a same symbol; receiving, from a base station, a control message scheduling transmission of a message during a symbol, wherein a transmission direction conflict exists between a first transmission direction of the message and a second transmission direction of the symbol; and communicating the message during the symbol based at least in part on the full-duplexing rule.

Aspect 2: The method of aspect 1, further comprising: receiving, from the base station, control signaling identifying the full-duplexing rule that indicates for the UE to refrain from using the transmission dropping rule for transmission direction conflicts that occur for a downlink symbol, for an uplink symbol, for a flexible symbol, for a dedicated symbol, or any combination thereof, wherein communicating the message during the symbol is based at least in part on the UE refraining from using the transmission dropping rule.

Aspect 3: The method of aspect 2, wherein the control signaling, the control message, or both comprise one or more of a radio resource control message, a medium access control-control element, or an instance of downlink control information.

Aspect 4: The method of any of aspects 1 through 3, wherein communicating the message during the symbol comprises: communicating the message during the symbol based at least in part on the control message identifying the full-duplexing rule that indicates for the UE to refrain from using the transmission dropping rule.

Aspect 5: The method of any of aspects 1 through 4, further comprising: receiving, from the base station, control signaling indicating a set of transmission dropping rules comprising the transmission dropping rule and a set of full-duplexing rules comprising the full-duplexing rule, wherein communicating the message during the symbol is based at least in part on the control signaling.

Aspect 6: The method of any of aspects 1 through 5, wherein identifying the full-duplexing rule comprises: identifying the full-duplexing rule that corresponds to a downlink symbol, an uplink symbol, a flexible symbol, a dedicated symbol, a dedicated radio resource control downlink symbol, or any combination thereof.

Aspect 7: The method of any of aspects 1 through 6, further comprising: receiving, from the base station, control signaling indicating a capability of the base station to support full-duplex communications, wherein communicating the message during the symbol is based at least in part on the capability of the base station to support full-duplex communications.

Aspect 8: The method of any of aspects 1 through 7, further comprising: identifying the transmission direction conflict between an uplink transmission direction of the message and a radio resource control downlink transmission direction of the symbol, wherein the message comprises a semi-persistent acknowledgement or negative acknowledgement message, a scheduling request, a configured grant uplink transmission, a dynamic grant uplink transmission, or any combination thereof.

Aspect 9: The method of any of aspects 1 through 8, further comprising: identifying the transmission direction conflict between a downlink transmission direction of the message and a radio resource control uplink transmission direction of the symbol, wherein the message comprises a downlink transmission on a control resource set, a semi-persistent downlink transmission, a dynamic grant downlink transmission, or any combination thereof.

Aspect 10: The method of any of aspects 1 through 9, further comprising: identifying the transmission direction conflict between an uplink or downlink transmission direction of the message and a downlink or uplink transmission direction of the symbol that is a radio resource control flexible symbol, wherein the message comprises a semi-persistent acknowledgement or negative acknowledgement message, a scheduling request, a configured grant transmission, a semi-persistent transmission, a reference signal transmission, or any combination thereof.

Aspect 11: The method of any of aspects 1 through 10, further comprising: identifying the transmission direction conflict between the first transmission direction of the message and the second transmission direction of the symbol based at least in part on a slot format indicator configuration of the symbol, wherein the message comprises a transmission on a control resource set and the symbol comprises a slot format indicator uplink symbol or a slot format indicator flexible symbol.

Aspect 12: The method of any of aspects 1 through 11, further comprising: identifying the transmission direction conflict between the first transmission direction of the message and the second transmission direction of the symbol based at least in part on a first reference component carrier of the symbol and a second component carrier to be used for transmission of the message, the symbol comprising a radio resource control downlink symbol, the message comprising a configured grant uplink transmission, a dynamic grant uplink transmission, or both.

Aspect 13: The method of any of aspects 1 through 12, further comprising: identifying the transmission direction conflict between the first transmission direction of the message and the second transmission direction of the symbol based at least in part on a reference component carrier of the symbol and a component carrier to be used for transmission of the message, the symbol comprising an uplink symbol, the message comprising a configured grant downlink transmission, a dynamic grant downlink transmission, or any combination thereof.

Aspect 14: The method of any of aspects 1 through 13, further comprising: receiving, from the base station, downlink control information that comprises a dynamic indication of the full-duplexing rule.

Aspect 15: The method of any of aspects 1 through 14, wherein the UE is preconfigured with the full-duplexing rule; or the full-duplexing rule is configured by the base station.

Aspect 16: The method of any of aspects 1 through 15, wherein the full-duplexing rule is applicable to dedicated radio resource control downlink symbols.

Aspect 17: The method of any of aspects 1 through 16, wherein the symbol comprises a radio resource control downlink symbol, a dedicated radio resource control downlink symbol, a common radio resource control downlink symbol, a radio resource control downlink symbol configured by the base station, or a combination thereof.

Aspect 18: A method for wireless communications at a base station, comprising: identifying a full-duplexing rule that indicates to refrain from using a transmission dropping rule for transmission direction conflicts that occur between uplink and downlink transmissions in a same symbol; transmitting, to a UE, a control message scheduling transmission of a message during a symbol, wherein a transmission direction conflict exists between a first transmission direction of the message and a second transmission direction of the symbol; and communicating the message during the symbol based at least in part on the full-duplexing rule and the control message.

Aspect 19: The method of aspect 18, further comprising: transmitting control signaling identifying the full-duplexing rule that indicates for the UE to refrain from using the transmission dropping rule when the transmission direction conflict occurs for a downlink symbol, for an uplink symbol, for a flexible symbol, for a dedicated symbol, or any combination thereof, wherein communicating the message during the symbol is based at least in part on the UE refraining from using the transmission dropping rule.

Aspect 20: The method of any of aspects 18 through 19, wherein communicating the message during the symbol comprises: communicating the message during the symbol based at least in part on the control message identifying the full-duplexing rule that indicates for the UE to refrain from using the transmission dropping rule.

Aspect 21: The method of any of aspects 18 through 20, further comprising: transmitting control signaling indicating a set of transmission dropping rules comprising the transmission dropping rule and a set of full-duplexing rules comprising the full-duplexing rule, wherein communicating the message during the symbol is based at least in part on the control signaling.

Aspect 22: The method of aspect 21, wherein the set of transmission dropping rules, the set of full-duplexing rules, or both correspond to one or more dedicated radio resource control downlink symbols.

Aspect 23: The method of any of aspects 18 through 22, wherein transmitting the control message comprises: transmitting, to the UE, control signaling indicating a capability of the base station to support full-duplex communications, wherein communicating the message during the symbol is based at least in part on the capability of the base station to support full-duplex communications.

Aspect 24: The method of any of aspects 18 through 23, wherein communicating the message during the symbol comprises: receiving the message from the UE during the symbol based at least in part on the control message, wherein the symbol comprises a radio resource control downlink symbol and the message comprises a semi-persistent acknowledgement or negative acknowledgement message, a scheduling request, a configured grant transmission, a semi-persistent transmission, a reference signal transmission, or any combination thereof; and transmitting a second message to a second UE during the symbol in accordance with a full-duplex communication scheme.

Aspect 25: The method of any of aspects 18 through 24, wherein communicating the message during the symbol comprises: transmitting the message to the UE during the symbol based at least in part on the control message, wherein the symbol comprises a radio resource control uplink symbol and the message comprises a downlink transmission on a control resource set, a semi-persistent downlink transmission, a dynamic grant downlink transmission, or any combination thereof and receiving a second message from a second UE during the symbol in accordance with a full-duplex communication scheme.

Aspect 26: The method of any of aspects 18 through 25, wherein communicating the message during the symbol comprises: communicating the message during the symbol based at least in part on the control message, wherein the symbol comprises a radio resource control flexible symbol and the message comprises a semi-persistent acknowledgement or negative acknowledgement message, a scheduling request, a configured grant transmission, a semi-persistent transmission, a reference signal transmission, or any combination thereof.

Aspect 27: The method of any of aspects 18 through 26, wherein the full-duplexing rule is based at least in part on a scheduling alignment of common radio resource control downlink symbols for a plurality of base stations comprising the base station.

Aspect 28: An apparatus for wireless communications at a UE, comprising a processor; memory coupled with the processor; and instructions stored in the memory and executable by the processor to cause the apparatus to perform a method of any of aspects 1 through 17.

Aspect 29: An apparatus for wireless communications at a UE, comprising at least one means for performing a method of any of aspects 1 through 17.

Aspect 30: A non-transitory computer-readable medium storing code for wireless communications at a UE, the code comprising instructions executable by a processor to perform a method of any of aspects 1 through 17.

Aspect 31: An apparatus for wireless communications at a base station, comprising a processor; memory coupled with the processor; and instructions stored in the memory and executable by the processor to cause the apparatus to perform a method of any of aspects 18 through 27.

Aspect 32: An apparatus for wireless communications at a base station, comprising at least one means for performing a method of any of aspects 18 through 27.

Aspect 33: A non-transitory computer-readable medium storing code for wireless communications at a base station, the code comprising instructions executable by a processor to perform a method of any of aspects 18 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   identifying a full-duplexing rule that overrides a transmission dropping rule for transmission direction conflicts that occur between transmissions in a same symbol;
   receiving a control message that schedules transmission of a message in a symbol, wherein a transmission direction conflict exists between a first transmission direction of the message and a second transmission direction of the symbol; and
   communicating the message in the symbol based at least in part on the full-duplexing rule which overrides the transmission dropping rule.

2. The method of claim 1, further comprising:
   receiving control signaling identifying the full-duplexing rule that overrides the transmission dropping rule for transmission direction conflicts that occur for a downlink symbol, for an uplink symbol, for a flexible symbol, for a dedicated symbol, or any combination thereof, wherein communicating the message during the symbol is based at least in part on the full-duplexing rule overriding the transmission dropping rule.

3. The method of claim 2, wherein the control signaling, the control message, or both comprise one or more of a radio resource control message, a medium access control-control element, or an instance of downlink control information.

4. The method of claim 1, wherein communicating the message during the symbol comprises:
   communicating the message during the symbol based at least in part on the control message identifying the full-duplexing rule that overrides the transmission dropping rule.

5. The method of claim 1, further comprising:
   receiving control signaling indicating a set of transmission dropping rules comprising the transmission dropping rule and a set of full-duplexing rules comprising the full-duplexing rule, wherein communicating the message during the symbol is based at least in part on the control signaling.

6. The method of claim 1, wherein identifying the full-duplexing rule comprises:
   identifying the full-duplexing rule that corresponds to a downlink symbol, an uplink symbol, a flexible symbol, a dedicated symbol, a dedicated radio resource control downlink symbol, or any combination thereof.

7. The method of claim 1, further comprising:
   receiving control signaling indicating a capability of a network entity to support full-duplex communications, wherein communicating the message during the symbol is based at least in part on the capability of the network entity to support full-duplex communications.

8. The method of claim 1, further comprising:
   identifying the transmission direction conflict between an uplink transmission direction of the message and a radio resource control downlink transmission direction of the symbol, wherein the message comprises a semi-persistent acknowledgement or negative acknowledgement message, a scheduling request, a configured grant uplink transmission, a dynamic grant uplink transmission, or any combination thereof.

9. The method of claim 1, further comprising:
   identifying the transmission direction conflict between a downlink transmission direction of the message and a radio resource control uplink transmission direction of the symbol, wherein the message comprises a downlink transmission on a control resource set, a semi-persistent downlink transmission, a dynamic grant downlink transmission, or any combination thereof.

10. The method of claim 1, further comprising:
    identifying the transmission direction conflict between an uplink or downlink transmission direction of the message and a downlink or uplink transmission direction of the symbol that is a radio resource control flexible symbol, wherein the message comprises a semi-persistent acknowledgement or negative acknowledgement message, a scheduling request, a configured grant transmission, a semi-persistent transmission, a reference signal transmission, or any combination thereof.

11. The method of claim 1, further comprising:
identifying the transmission direction conflict between the first transmission direction of the message and the second transmission direction of the symbol based at least in part on a slot format indicator configuration of the symbol, wherein the message comprises a transmission on a control resource set and the symbol comprises a slot format indicator uplink symbol or a slot format indicator flexible symbol.

12. The method of claim 1, further comprising:
identifying the transmission direction conflict between the first transmission direction of the message and the second transmission direction of the symbol based at least in part on a first reference component carrier of the symbol and a second component carrier to be used for transmission of the message, the symbol comprising a radio resource control downlink symbol, the message comprising a configured grant uplink transmission, a dynamic grant uplink transmission, or both.

13. The method of claim 1, further comprising:
identifying the transmission direction conflict between the first transmission direction of the message and the second transmission direction of the symbol based at least in part on a reference component carrier of the symbol and a component carrier to be used for transmission of the message, the symbol comprising an uplink symbol, the message comprising a configured grant downlink transmission, a dynamic grant downlink transmission, or any combination thereof.

14. The method of claim 1, further comprising:
receiving downlink control information that comprises a dynamic indication of the full-duplexing rule.

15. The method of claim 1, wherein:
the UE is preconfigured with the full-duplexing rule; or
the full-duplexing rule is configured by a network entity.

16. The method of claim 1, wherein the full-duplexing rule is applicable to dedicated radio resource control downlink symbols.

17. The method of claim 1, wherein the symbol comprises a radio resource control downlink symbol, a dedicated radio resource control downlink symbol, a common radio resource control downlink symbol, a radio resource control downlink symbol, or a combination thereof.

18. A method for wireless communications at a network entity, comprising:
identifying a full-duplexing rule that overrides a transmission dropping rule for transmission direction conflicts that occur between transmissions in a same symbol;
transmitting a control message that schedules transmission of a message during a symbol, wherein a transmission direction conflict exists between a first transmission direction of the message and a second transmission direction of the symbol; and
communicating the message during the symbol based at least in part on the full-duplexing rule which overrides the transmission dropping rule.

19. The method of claim 18, further comprising:
transmitting control signaling identifying the full-duplexing rule that overrides the transmission dropping rule when the transmission direction conflict occurs for a downlink symbol, for an uplink symbol, for a flexible symbol, for a dedicated symbol, or any combination thereof, wherein communicating the message during the symbol is based at least in part on the full-duplexing rule overriding the transmission dropping rule.

20. The method of claim 18, wherein communicating the message during the symbol comprises:
communicating the message during the symbol based at least in part on the control message identifying the full-duplexing rule that overrides the transmission dropping rule.

21. The method of claim 18, further comprising:
transmitting control signaling indicating a set of transmission dropping rules comprising the transmission dropping rule and a set of full-duplexing rules comprising the full-duplexing rule, wherein communicating the message during the symbol is based at least in part on the control signaling.

22. The method of claim 21, wherein the set of transmission dropping rules, the set of full-duplexing rules, or both correspond to one or more dedicated radio resource control downlink symbols.

23. The method of claim 18, wherein transmitting the control message comprises:
transmitting control signaling indicating a capability of the network entity to support full-duplex communications, wherein communicating the message during the symbol is based at least in part on the capability of the network entity to support full-duplex communications.

24. The method of claim 18, wherein communicating the message during the symbol comprises:
receiving the message during the symbol based at least in part on the control message, wherein the symbol comprises a radio resource control downlink symbol and the message comprises a semi-persistent acknowledgement or negative acknowledgement message, a scheduling request, a configured grant transmission, a semi-persistent transmission, a reference signal transmission, or any combination thereof; and
transmitting a second message during the symbol in accordance with a full-duplex communication scheme.

25. The method of claim 18, wherein communicating the message during the symbol comprises:
transmitting the message during the symbol based at least in part on the control message, wherein the symbol comprises a radio resource control uplink symbol and the message comprises a downlink transmission on a control resource set, a semi-persistent downlink transmission, a dynamic grant downlink transmission, or any combination thereof; and
receiving a second message during the symbol in accordance with a full-duplex communication scheme.

26. The method of claim 18, wherein communicating the message during the symbol comprises:
communicating the message during the symbol based at least in part on the control message, wherein the symbol comprises a radio resource control flexible symbol and the message comprises a semi-persistent acknowledgement or negative acknowledgement message, a scheduling request, a configured grant transmission, a semi-persistent transmission, a reference signal transmission, or any combination thereof.

27. The method of claim 18, wherein the full-duplexing rule is based at least in part on a scheduling alignment of common radio resource control downlink symbols for a plurality of network entities including the network entity.

28. An apparatus for wireless communications at a user equipment (UE), comprising:
one or more processors;
memory coupled with the one or more processors; and instructions stored in the memory and executable by the one or more processors to cause the apparatus to:

identify a full-duplexing rule that overrides a transmission dropping rule for transmission direction conflicts that occur between transmissions in a same symbol;

receive a control message that schedules transmission of a message in a symbol, wherein a transmission direction conflict exists between a first transmission direction of the message and a second transmission direction of the symbol; and communicate the message in the symbol based at least in part on the full-duplexing rule which overrides the transmission dropping rule.

29. The apparatus of claim 28, wherein the instructions are further executable by the one or more processors to cause the apparatus to:

receive control signaling identifying the full-duplexing rule that overrides the transmission dropping rule for transmission direction conflicts that occur for a downlink symbol, for an uplink symbol, for a flexible symbol, for a dedicated symbol, or any combination thereof, wherein communicating the message during the symbol is based at least in part on the full-duplexing rule overriding the transmission dropping rule.

30. An apparatus for wireless communications at a network entity, comprising:

one or more processors;

memory coupled with the one or more processors; and instructions stored in the memory and executable by the one or more processors to cause the apparatus to:

identify a full-duplexing rule that overrides a transmission dropping rule for transmission direction conflicts that occur between transmissions in a same symbol;

transmit a control message that schedules transmission of a message during a symbol, wherein a transmission direction conflict exists between a first transmission direction of the message and a second transmission direction of the symbol; and communicate the message during the symbol based at least in part on the full-duplexing rule which overrides the transmission dropping rule.

* * * * *